United States Patent
Kuboyama et al.

(10) Patent No.: US 6,969,695 B2
(45) Date of Patent: Nov. 29, 2005

(54) INFORMATION RECORDING-DISPLAYING CARD, IMAGE PROCESSING METHOD USING SAME, AND IMAGE PROCESSOR

(75) Inventors: Hiroki Kuboyama, Shizuoka (JP); Tadafumi Tatewaki, Shizuoka (JP); Shuji Miyamoto, Shizuoka (JP); Yoshihiko Hotta, Shizuoka (JP); Hiroshi Higashi, Shiga (JP); Shinya Takemoto, Shiga (JP); Tomohiko Terai, Shiga (JP); Makoto Kajiyashiki, Tokyo (JP)

(73) Assignees: Ricoh Company, Ltd., Tokyo (JP); Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 10/971,333

(22) Filed: Oct. 25, 2004

(65) Prior Publication Data

US 2005/0170961 A1    Aug. 4, 2005

Related U.S. Application Data

(63) Continuation of application No. PCT/JP03/05159, filed on Apr. 23, 2003.

(30) Foreign Application Priority Data

| Apr. 23, 2002 | (JP) | 2002-120989 |
| Apr. 26, 2002 | (JP) | 2002-125413 |
| May 1, 2002   | (JP) | 2002-129582 |
| Sep. 2, 2002  | (JP) | 2002-257136 |

(51) Int. Cl.$^7$ .......................................... B41M 5/30
(52) U.S. Cl. .................... 503/201; 156/235; 427/150; 427/151; 427/152; 503/200; 503/226
(58) Field of Search .................. 156/235; 427/150, 427/151, 152; 503/200, 201, 226

(56) References Cited

U.S. PATENT DOCUMENTS

6,015,770 A    1/2000    Amano et al.

FOREIGN PATENT DOCUMENTS

| JP | 02-188293 | 7/1990 |
| JP | 02-188294 | 7/1990 |
| JP | 04-033884 | 2/1992 |
| JP | 05-124360 | 5/1993 |

(Continued)

OTHER PUBLICATIONS

U.S. Appl. No. 10/971,333, filed Oct. 25, 2004, Kuboyama et al.

U.S. Appl. No. 10/971,405, filed Oct. 25, 2004, Tatewaki et al.

*Primary Examiner*—Bruce Hess
(74) *Attorney, Agent, or Firm*—Oblon, Spivak, McClelland, Maier & Neustadt, P.C.

(57) ABSTRACT

An information recording-displaying card, includes: core sheet; and over sheet bonded to core sheet, including: a support including an amorphous polyester resin, and a reversible thermosensitive recording layer on the support, including: an electron-donating coloring compound, and an electron-accepting compound. The reversible thermosensitive recording layer is capable of forming coloring state and decolorizing state, with difference in at least one of the following: heating temperature, and cooling rate after heating. The over sheet is embossable in upper portion thereof, functions as image displaying section, and meets the following conditions (A), (B) and (C): (A) (over sheet's upper limit temperature for erasing$-30°$ C.)>(over sheet's temperature of storage elasticity E' (1.0 E+08) Pa), (B) 10 $\mu$m or less of surface waviness WCM, and (C) 1.0 E+02 Pa$\leq$ (storage elasticity E' of reversible thermosensitive over sheet at 180° C.)$\leq$5.0 E+07 Pa.

29 Claims, 4 Drawing Sheets

FOREIGN PATENT DOCUMENTS

| | | |
|---|---|---|
| JP | 06-210954 | 8/1994 |
| JP | 07-290840 | 11/1995 |
| JP | 09-020084 | 1/1997 |
| JP | 09-290583 | 11/1997 |
| JP | 10-100547 | 4/1998 |
| JP | 11-058963 | 3/1999 |
| JP | 11-154210 | 6/1999 |
| JP | 11-240262 | 9/1999 |
| JP | 11-320931 | 11/1999 |
| JP | 2000-001074 | 1/2000 |
| JP | 2000-137782 | 5/2000 |
| JP | 2000-246858 | 9/2000 |
| JP | 2001-071669 | 3/2001 |
| JP | 2001-088443 | 4/2001 |
| JP | 2001-162936 | 6/2001 |
| JP | 2001-287457 | 10/2001 |
| JP | 2001-328376 | 11/2001 |
| JP | 2001-331111 | 11/2001 |
| JP | 2001-341427 | 12/2001 |
| JP | 2002-103654 | 5/2002 |
| JP | 2002-132155 | 5/2002 |
| JP | 2002-160453 | 6/2002 |
| JP | 2002-160454 | 6/2002 |
| JP | 2002-178642 | 6/2002 |
| JP | 2003-145931 | 5/2003 |

FIG. 1A  FIG. 1B
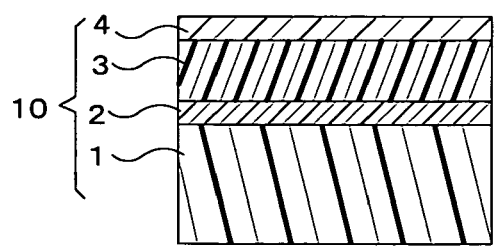
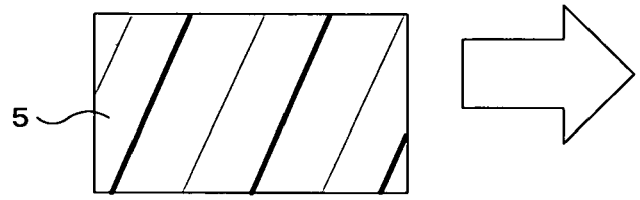
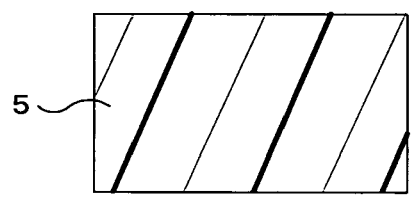
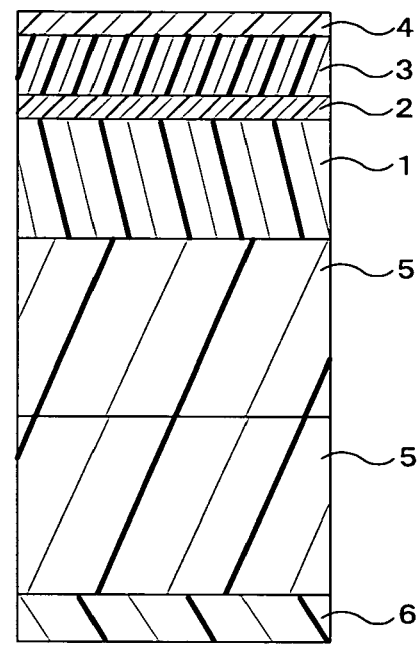

INFORMATION RECORDING-DISPLAYING CARD, IMAGE PROCESSING METHOD USING SAME, AND IMAGE PROCESSOR

CROSS-REFERENCE TO RELATED APPLICATIONS

This is a continuation of Application No. PCT/JP03/05159, filed on Apr. 23, 2003.

BACKGROUND OF THE INVENTION

1. Field of the Invention

The present invention relates to an information recording-displaying card capable of displaying visibly and rewriting information by heating, an over sheet used for the information recording-displaying card, an image processing method, an image processor, and a method of manufacturing the information recording-displaying card.

2. Description of the Related Art

Information recording card such as a membership card, an ID card, a credit card, a cash card, an IC card and the like partly has an information storing section such as a magnetic tape, an IC chip and the like. This information storing section can record an individual secret information, especially such as money and the like. Due to its compactness and convenience, the information recording card is widespread in many countries in modern society. The information recording card carries out reading and rewriting of the recorded information with a special unit, although leaving a shortcoming that the card owner cannot visually (directly) verify the recorded information.

On the other hand, developed and used recently in the market is a rewritable card capable of carrying out a temporary image forming, and capable of erasing the image when the image is not necessary. More specifically, the above rewritable card is the one that can visually display the information on its surface and can rewrite the information. Some rewritable cards are provided with a magnetic information storing function.

The above function of the rewritable card, namely, displaying visually and rewriting the information as an image can be expressed by forming the following states: Between an electron-donating compound (so-called a leuco dye) and an acid/base compound, a coloring state and a decolorizing state are relatively formed with a difference in one of the following: i) a heating temperature, and ii) a cooling rate after a heating. Hereinabove, the electron-donating compound has a lactone ring in its molecular structure and may assume the coloring by making a structural change attributable to the lactone ring opened by an electron discharge, while the acid/base compound functions as a developing-reducing reagent. For example, Japanese Patent Application Laid-Open (JP-A) No. 2-188293 and JP-A No. 2-188294 disclose a rewritable card made of a reversible recording material having such a structure that a reversible thermosensitive recording layer is disposed on a support. Herein, a resin base material for the reversible thermosensitive recording layer contains, as main materials thereof, the electron-donating compound and the developing-reducing reagent which are described above. More specifically, the above reversible thermosensitive recording material uses a difference in reaction rate between the acid and the base, to thereby repeat the colorings and the decolorizings.

JP-A No. 5-124360 and JP-A No. 6-210954 disclose a reversible thermosensitive recording material having a resin base material containing i) a leuco dye and ii) an electron-accepting compound having a long-chain alkyl group as a developing agent. The developing agent with the long-chain alkyl structure has a cohesive force, and contacts the leuco dye or is separated from the leuco dye, thus repeating the colorings and decolorizings.

Since sufficiently compensating for the conventional shortcoming of the information recording card described above, the reversible thermosensitive recording material having the functions of displaying visually and rewriting the information attracts attention. With this, such a card is developed and recently begins to be used in the market as has a first function (as an image displaying section) of displaying visually and rewriting information and a second function (as an information storing section) of recording and rewriting the information. Hereinafter, the above card is to be referred to as "information recording-displaying card."

The above information recording-displaying card, basically, uses i) an over sheet such as a reversible thermosensitive recording material in which at least a reversible thermosensitive recording layer is disposed on a support, and ii) a core sheet having a function as the conventional information recording card. The above information recording-displaying card can be formed by overlapping the over sheet's support side with the core sheet, followed by a thermo-compression bonding and the like.

The image displaying function of the above information recording-displaying card is carried out by the over sheet. On the other hand, the image storing function of the above information recording-displaying card may vary with types of the card. More specifically about this: The information storing function by a magnetic material such as a magnetic tape can be carried out by the over sheet or the core sheet. However, the information storing function by an IC chip, antenna coil, a magnetic stripe and the like is, in general, disposed in a thick core sheet.

Some information recording-displaying cards are thin and others are thick. Since the over sheet is thin, the thickness of the information recording-displaying card is ordinarily dependent on the thickness of the core sheet.

The information recording-displaying card recently beginning to be used in the market is made of a combination of the following i) and ii): i) a reversible thermosensitive over sheet using, as a support, a polyethylene terephthalate (PET) film, and ii) a core sheet having, as a raw material, polyvinyl chloride (PVC) resin, polyvinyl chloride resin such as copolymer of vinyl chloride and vinyl acetate, or polycarbonate resin.

The above materials are widely used for the following reasons: The polyethylene terephthalate (PET) film used for the support of the over sheet is highly resistant to a solution which is made by dissolving a composition (especially, constituting the reversible recording layer) in a solvent. The polyvinyl chloride (PVC) resin used as the core sheet material is excellent in physical property, mechanical property, embossability (at character section), and the like.

The above polyvinyl chloride resin is also proper as the support of the over sheet, so as to obtain an image eraseability, in view of expressing, to a certain extent, a flexibility by heat.

Though being excellent as the card's raw material, the above polyvinyl chloride may, from some viewpoints, cause a hydrogen chloride gas when incinerated after being used and then scrapped, thus damaging an incinerator and reducing lifetime thereof.

Mover, movement of eliminating the polyvinyl chloride (PVC) resin is becoming more and more active in various countries, although relation between the polyvinyl chloride (PVC) and dioxine is not clarified. The polyvinyl chloride resin is used for the information recording-displaying card as well as the conventional information recording card, in other words, has high publicity. With the above background, other material replaceable with the polyvinyl chloride (PVC) is desired also domestically.

For use as the raw material for the information recording-displaying card, a thermoplastic resin is being studied that does not contain halogen. Examples of the above thermoplastic resin include polyethylene resin, polypropyrene resin, polyester resin, polycarbonate resin, polyacrylic resin, and the like.

Among the above, the card's base material made of polycarbonate resin and the like is highly resistant to heat, thereby, is unlikely to cause deformation attributable to heat, becoming an excellent material in terms of durability. The information recording-displaying card using the polycarbonate resin and the like is, therefore, appearing in the market.

However, being low in deformability, the polycarbonate resin is low in embossability. The reversible thermosensitive recording material for writing-erasing by using a thermal head may lose head matching property with the thermal head contacting the information recording-displaying card, thus reducing sensitivity, leading especially to deteriorated eraseability, which is a shortcoming. A raw material replaceable with the polyvinyl chloride resin is conventionally not found.

On the other hand, a unity which is the over sheet bonded with the core sheet is to be embossed. The thus formed "emboss marking" is to be marked on the information recording-displaying card, to thereby make personal information identifiable, which is important in terms of convenience and usefulness. Especially, a thick card such as the credit card, the bank card and the like is to be provided with the "emboss marking," which is indispensable in the modern society. In sum, the embossing is more and more required from users and various industries.

The above "emboss marking" is mainly used for card number, expiration, owner's name and the like, and has such a function as to be copied with a roller, by interposing the card into a copy voucher for reckoning at a store and the like. The above use of the "emboss marking" is prevalent domestically and overseas.

The polyethylene terephthalate (PET) film used for the support of the over sheet is so rigid as to have low deformation by an applied pressure, thereby, has an extremely low embossability. With this, even when the polyvinyl chloride resin used for the core sheet has a good embossability and the embossing is carried out from upside of the over sheet, the over sheet using the polyethylene terephthalate (PET) film may cause an insufficient "emboss marking." Moreover, the polyethylene terephthalate (PET) film becoming too thick may cause breaking of the card in the embossing.

Especially, a thick card with the above non-contact IC chip, antenna coil, magnetic stripe and the like embedded therein cannot sufficiently absorb irregularity thereof, thereby making it impossible to flatten the card's surface. With this, the above thick card cannot smoothly carry out rewriting of the recording by the thermal head and the like, therefore, as the case may be, forcibly increases printing pressure and temperature. As a result, the above thick card may have failures such as having scratches, having remaining gouge, causing deformation, and the like, thus limiting application and manufacturing methods, and thereby finding difficulty in using manufacturing steps of the general-purpose card.

The information recording-displaying card which is recently beginning to be used in the market has the following structure. The embossing is carried out in an embossable space formed on the core sheet's surface which space is free from the over sheet. In this structure, the over sheet bonded to the core sheet is smaller in size than the core sheet's surface. The above over sheet is to be bonded to the core sheet such that the "emboss marking" can be disposed in the embossable space free from the over sheet.

The above method is limited in terms of manufacturing since, for example, the over sheet reduced in size is to be accurately bonded to the core sheet, moreover, the above method is limited in terms of an area for the over sheet's image display function, which are shortcomings.

In sum, the embossing cannot be carried out for a unity having the over sheet bonded to the entire face of the core sheet, making an information recording-displaying card without the "emboss marking."

The reversible thermosensitive recording material used as the over sheet is "thermosensitive" which is a special material. In each of the steps including i) overlapping the over sheet (having the above special property) on the core sheet, ii) uniting the over sheet with the core sheet by pressing-heating, and iii) completing the embossing, it may be difficult to manufacture the information recording-displaying card without influencing the above special property, namely, "reversible thermosensitivity."

Moreover, the polyethylene terephthalate film used as the support of the over sheet is made of a material which is higher in heat resistance and smaller in heat deformation than the polycarbonate resin. Therefore, applying a thermal head as a heating unit to a surface of the above over sheet of the information recording-displaying card beginning to be used in the market may cause very little deformation by the heat. This may make the adhesion between the thermal head's face and the over sheer's surface insufficient, thus losing head matching at the heat application and thereby decreasing the sensitivity. With this, especially the eraseability may become low, namely, an insufficient image eraseability is caused, which is a shortcoming.

The present inventors have studied the known data related to the above type of the information recording-displaying card, as a result, to find that any of the known data are free from description of the embossability, and image eraseability involved with the embossability.

Described below are specific examples of the information recording-displaying cards disclosed in cited patent documents.

Firstly, for example, JP-A No. 2001-341427 (page 2 to page 4, example 1) discloses an over sheet which is a reversible recording film having the following structure. A print layer, a transparent support having light transmission of 50% or more, a reversible recording layer, and a protective layer are disposed on a support. A thick information recording-displaying card is disclosed having the support side united with a core sheet by using an adhesive. However, JP-A No. 2001-341427 (page 2 to page 4, example 1) does not describe embossability at all.

Material usable for the above support and the above transparent support are described (likewise between the two) as follows: "a plastic film is applicable thereto which is rigid, namely, excellent in heat resistance, tensile strength and the like," and "selectable thickness in a range from 8.5 $\mu$m to 300 $\mu$m, preferably 8.5 $\mu$m to about 250 $\mu$m." Specific examples of the material include polyethylene terephthalate (PET) film, polyethylene naphthalate (PEN) film, polyimide (PI) film, polyphenylene sulfide (PPS) film, and the like.

Moreover, the transparent support is made of materials such as vinyl chloride film, PET-G film, and polycarbonate and the like.

JP-A No. 2001-341427 (page 2 to page 4, example 1) describes that the above films exemplified are made of plastic which is rigid, namely, excellent in tensile strength and the like. In view of embossability, however, JP-A No. 2001-341427 (page 2 to page 4, example 1) includes those evidently not embossable, judging from the description of an unrigid film and too rigid a film, and the description of a small thermal deformation and a large thermal deformation.

In view of thickness, an example 1 in JP-A No. 2001-341427 (page 2 to page 4, example 1) does not describe thickness of polyethylene terephthalate film used as the support but describes that the transparent support uses a transparent polyethylene terephthalate film having thickness of 25 $\mu$m, which is too thick for the embossing of the over sheet.

Moreover, the over sheet itself that is formed according to this example 1 of JP-A No. 2001-341427 (page 2 to page 4, example 1) has the polyethylene terephthalate film as the support and as the transparent support, thus losing the head matching at the heat application and thereby decreasing the sensitivity. With this, especially the image eraseability may become low.

As a core sheet material, JP-A No. 2001-341427 (page 2 to page 4, example 1) describes examples including vinyl chloride resin, PET-G typical of polyester resin, polycarbonate resin, which are used alone or in combination. No description of the embossability in JP-A No. 2001-341427 (page 2 to page 4, example 1) proves impossibility of the embossing.

For the next example, JP-A No. 2000-137782 (example 1 and example 2) discloses a card's base material (core sheet) which is a thermoplastic resin sheet having low crystal property of 5% or less. A thick information recording-displaying card is disclosed which is a unity of the above card's base material (core sheet) bonded with a reversible thermosensitive recording tape (over sheet). The reversible thermosensitive recording tape hereinabove is provided with a reversible thermosensitive recording layer (containing a leuco compound and a developing agent) on a transparent PET film.

JP-A No. 2000-137782 (example 1 and example 2) is, however, free from any description of embossing. Judging from the thick PET film (25 $\mu$m in thickness in an example 1, and 38 $\mu$m thick in an example 2), the information recording-displaying card is not embossable and has a poor eraseability.

For the next example, JP-A No. 11-154210 (example) discloses i) a sheet (core sheet) incorporating therein an IC chip module, and ii) a reversible thermosensitive recording sheet (over sheet) provided with a reversible thermosensitive recording layer (containing a leuco dye and a developing agent) on a film, which two sheets are opposed to each other. To a gap between the core sheet and the over sheet, a resin is injected and thereby the two sheets are bonded with each other, thus forming an IC card (thick information recording-displaying card). However, JP-A No. 11-154210 (example) is free from any description of embossing.

For the next example, JP-A No. 2001-88443 (example) discloses a recording medium used for mass production adopting a Kanban (signboard) method, which recording medium has a base material, a reversible thermosensitive recording layer (containing a leuco compound and a developing agent) on the base material, and a protective layer. Various types of plastic films are exemplified as the base material. A white PET which is the base material in each example has a thickness of 188 $\mu$m, 250 $\mu$m and 350 $\mu$m, proving no attention is paid to embossing.

JP-A No. 2000-137782 (example 1 and example 2), JP-A No. 11-154210 (example) and JP-A No. 2001-88443 (example) described above disclose various specific examples of materials for the support constituting the over sheet, and materials for raw materials constituting the core sheet. In view of the embossing, like JP-A No. 2001-341427 (page 2 to page 4, example 1), some materials thus exemplified may cause a small thermal deformation and other materials thus exemplified may cause a large thermal deformation, i.e., including those embossable and not embossable.

Summarizing the above, the information recording-displaying card beginning to be used in the market is not embossable on the over sheet's face. For the embossing, therefore, the image display area is reduced, making the image eraseability insufficient and causing environmental pollution in the scrapping and disposal.

The information recording-displaying card disclosed in the known data is not studied in view of the embossing or the image eraseability involved with the embossability. Moreover, no proposal is made in the above known data for solving the environmental pollution in the scrapping and disposal.

For bringing about a sufficient embossability to the information recording-displaying card, each of the over sheet and the core sheet constituting the information recording-displaying card, and the unity of the over sheet and the core sheet are to have the embossability. The conventionally known product and the conventionally known data are free from the above viewpoint.

By patent documents and the like, various proposals are conventionally made in terms of the reversible thermosensitive recording material. The embossability is, however, not suggested or raised at all in the above patent documents and the like. Not to mention, the embossability of an over sheet of an information recording-displaying card is not suggested or raised at all. In sum, securing embossability in this technical field and improving the image eraseability involved with the embossability are new issues.

In terms of the embossability, for example, JP-A No. 11-240262 (claims) discloses a heated transfer card having an acceptor layer disposed on a card's base material. More specifically, a dye in JP-A No. 11-240262 (claims) is contained in a heat transfer film in the field of heating-melting transfer recording or a sublimating transfer recording, instead of the reversible thermosensitive recording. The dye is to be melted or sublimated by a heat, and then is received or fixed by the acceptor layer.

The proposal in JP-A No. 11-240262 (claims) uses a special polyester for the card's base material, and a polyester copolymer is used for the acceptor layer which copolymer is made by copolymerizing a reactive silicone polymer. With the above, the moldability such as embossability of the heated transfer card is improved. As a matter of course, however, no description is made of accomplishment of the embossability without influencing the special property (namely, "reversible thermosensitivity") which is the image eraseability of the over sheet.

By patent documents and the like, many proposals are conventionally made in terms of the reversible thermosensitive recording material. The embossability is, however, not suggested or raised at all in the above patent documents and the like. Not to mention, the embossability of an over sheet of an information recording-displaying card is not suggested or raised at all. In sum, securing the embossability in this technical field and improving the repetition durability involved with the embossability are new issues.

Objects and Advantages

It is an object of the present invention to provide an information recording-displaying card that is excellent in embossability and displayed-image eraseability, easy to scrap and dispose, and is free from causing an environmental pollution in the scrapping and disposal. It is anther object of the present invention to provide an image processing method and an image processor for forming an image and erasing the image by using an over sheet and the information recording-displaying card each of which is made of a reversible thermosensitive recording material that is excellent in embossability and displayed-image eraseability. It is still another object of the present invention to provide a method of manufacturing the information recording-displaying card.

SUMMARY OF THE INVENTION

Hereinafter described are measures for accomplishing the above objects.

A first aspect of the present invention provides an information recording-displaying card, comprising: a core sheet; and an over sheet bonded to the core sheet, wherein the over sheet comprises: a support which comprises an amorphous polyester resin, and a reversible thermosensitive recording layer disposed on the support, wherein the reversible thermosensitive recording layer comprises: an electron-donating coloring compound, and an electron-accepting compound. The reversible thermosensitive recording layer is capable of relatively forming a coloring state and a decolorizing state, with a difference in at least one of the following: a heating temperature, and a cooling rate after a heating. The over sheet is embossable in an upper portion thereof, functions as an image displaying section, and meets the following condition (A), condition (B) and condition (C): condition (A) (the over sheet's upper limit temperature for erasing–30° C.)>(the over sheet's temperature of a storage elasticity E' (1.0 E+08) Pa), condition (B) 10 $\mu$m or less of a surface waviness WCM, and condition (C) 1.0 E+04 Pa$\leqq$(the storage elasticity E' of the reversible thermosensitive over sheet at 180° C.)$\leqq$5.0 E+07 Pa.

A second aspect of the present invention according to the first aspect provides that the temperature of the storage elasticity E' (1.0 E+08) Pa of the over sheet is less than 140° C.

A third aspect of the present invention according to the first aspect provides that the over sheet is bonded to substantially an entire face of the core sheet.

A fourth aspect of the present invention according to the first aspect provides that the support is one of the following: an amorphous polyester resin, and a polymer alloy which comprises an amorphous polyester resin and a polycarbonate resin.

A fifth aspect of the present invention according to the first aspect provides that a barrier layer is interposed between the support and the reversible thermosensitive recording layer.

A sixth aspect of the present invention according to the fifth aspect provides that the barrier layer is formed by bonding a resin film.

A seventh aspect of the present invention according to the sixth aspect provides that the resin film of the barrier layer has a thickness of 8 $\mu$m or less.

An eighth aspect of the present invention according to the sixth aspect provides that the resin film of the barrier layer is a polyester film subjected to a crystallizing treatment.

A ninth aspect of the present invention according to the fifth aspect provides that the barrier layer comprises, as a main component thereof, a resin which is capable of at least one of the following: being soluble in at least one of an alcohol solvent and water, and being dispersed in at least one of the alcohol solvent and the water.

A tenth aspect of the present invention according to the first aspect provides that the electron-donating coloring compound is a leuco dye.

An eleventh aspect of the present invention according to the first aspect provides that the electron-accepting compound is a phenol containing a straight chain hydrocarbon.

A twelfth aspect of the present invention according to the first aspect provides that the core sheet comprises at least a thermoplastic resin sheet having a thickness in a range from 0.05 mm to 5.00 mm.

A thirteenth aspect of the present invention according to the twelfth aspect provides that the core sheet is made of a materiel which is substantially common to a material for the support constituting the over sheet.

A fourteenth aspect of the present invention according to the first aspect provides that the information recording-displaying card comprises an information storing section.

A fifteenth aspect of the present invention according to the fourteenth aspect provides that the information storing section is one of the following: a section which comprises a magnetic material as a main material, and an IC chip.

A sixteenth aspect of the present invention according to the fourteenth aspect provides that the core sheet comprises a plurality of a thermoplastic resin sheets between which an IC chip is embedded, to thereby form the information storing section.

An seventeenth aspect of the present invention according to the fourteenth aspect provides that the over sheet has the information storing section which comprises, as a main material therefor, a magnetic material.

An eighteenth aspect of the present invention according to the first aspect provides that the information recording-displaying card has a mark formed through an embossing.

A nineteenth aspect of the present invention according to the eighteenth aspect provides that the mark formed through the embossing is disposed on the over sheet.

A twentieth aspect of the present invention provides a method of manufacturing an information recording-displaying card, comprising: heating-pressing a core sheet and an over sheet at a melting temperature or less of an electron-accepting compound; and bonding, thereby, the over sheet with the core sheet. The over sheet comprises: a support which comprises an amorphous polyester resin, and a reversible thermosensitive recording layer disposed on the support, wherein the reversible thermosensitive recording layer comprises: an electron-donating coloring compound, and the electron-accepting compound. The reversible thermosensitive recording layer is capable of relatively forming a coloring state and a decolorizing state, with a difference in at least one of the following: a heating temperature, and a cooling rate after a heating. The over sheet is embossable in an upper portion thereof, functions as an image displaying section, and meets the following condition (A), condition (B) and condition (C): condition (A) (the over sheet's upper limit temperature for erasing–30° C.)>(the over sheet's temperature of a storage elasticity E' (1.0 E+08) Pa), condition (B) 10 $\mu$m or less of a surface waviness WCM, and condition (C) 1.0 E+02 Pa$\leqq$(the storage elasticity E' of the reversible thermosensitive over sheet at 180° C.)$\leqq$5.0E+07 Pa.

A twenty-first aspect of the present invention according to the twentieth aspect provides that the heating-pressing is carried out at 150° C. or less, for bonding the over sheet with the core sheet.

A twenty-second aspect of the present invention provides an over sheet, comprising: a support which comprises an amorphous polyester resin; and a reversible thermosensitive recording layer disposed on the support, wherein the reversible thermosensitive recording layer comprises: an electron-donating coloring compound, and an electron-accepting compound. The reversible thermosensitive recording layer is capable of relatively forming a coloring state and a decolorizing state, with a difference in at least one of the following: a heating temperature, and a cooling rate after a heating. The over sheet is embossable in an upper portion thereof, functions as an image displaying section, and meets the following condition (A), condition (B) and condition (C): condition (A) (the over sheet's upper limit temperature for erasing−30° C.)>(the over sheet's temperature of a storage elasticity E' (1.0 E+08) Pa), condition (B) 10 μm or less of a surface waviness WCM, and condition (C) 1.0 E+02 Pa≦(the storage elasticity E' of the reversible thermosensitive over sheet at 180° C.)≦5.0 E+07 Pa.

A twenty-third aspect of the present invention provides an image processing method, comprising: heating a surface of an image displaying section of an information recording-displaying card; and carrying out thereby at least one of the following: displaying an image, and erasing the image. The information recording-displaying card, comprises: a core sheet; an over sheet bonded to the core sheet, wherein the over sheet comprises: a support which comprises an amorphous polyester resin, and a reversible thermosensitive recording layer disposed on the support, wherein the reversible thermosensitive recording layer comprises: an electron-donating coloring compound, and an electron-accepting compound. The reversible thermosensitive recording layer is capable of relatively forming a coloring state and a decolorizing state, with a difference in at least one of the following: a heating temperature, and a cooling rate after a heating. The over sheet is embossable in an upper portion thereof, functions as an image displaying section, and meets the following condition (A), condition (B) and condition (C): condition (A) (the over sheet's upper limit temperature for erasing−30° C.)>(the over sheet's temperature of a storage elasticity E' (1.0 E+08) Pa), condition (B) 10 μm or less of a surface waviness WCM, and condition (C) 1.0 E+02 Pa≦(the storage elasticity E' of the reversible thermosensitive over sheet at 180° C.)≦5.0 E+07 Pa.

A twenty-fourth aspect of the present invention according to the twenty-third aspect provides that a thermal head is used for the displaying of the image.

A twenty-fifth aspect of the present invention according to the twenty-third aspect provides that one of a thermal head and a ceramic heater is used for the erasing of the image.

A twenty-sixth aspect of the present invention according to the twenty-third aspect provides that the thermal head is used for the displaying and the erasing of the image, and an over writing is carried out by the erasing of the image and a displaying of a new image.

A twenty-seventh aspect of the present invention provides an image processor, comprising: at least one of the following: an image displaying unit for displaying an image to an information recording-displaying card; an image erasing unit for erasing the image; and an image displaying-erasing unit for displaying and erasing the image. The information recording-displaying card comprises: a core sheet; an over sheet bonded to the core sheet, wherein the over sheet comprises: a support which comprises an amorphous polyester resin, and a reversible thermosensitive recording layer disposed on the support, wherein the reversible thermosensitive recording layer comprises: an electron-donating coloring compound, and an electron-accepting compound. The reversible thermosensitive recording layer is capable of relatively forming a coloring state and a decolorizing state, with a difference in at least one of the following: a heating temperature, and a cooling rate after a heating. The over sheet is embossable in an upper portion thereof, functions as an image displaying section, and meets the following condition (A), condition (B) and condition (C): condition (A) (the over sheet's upper limit temperature for erasing−30° C.)>(the over sheet's temperature of a storage elasticity E' (1.0 E+08) Pa), condition (B) 10 μm or less of a surface waviness WCM, and condition (C) 1.0 E+02 Pa≦(the storage elasticity E' of the reversible thermosensitive over sheet at 180° C.)≦5.0E+07 Pa.

A twenty-eighth aspect of the present invention according to the twenty-seventh aspect provides that the image processor comprises at least the image displaying unit, and that the image displaying unit is a thermal head.

A twenty-ninth aspect of the present invention according to the twenty-seventh aspect provides that the image processor comprises at least the image erasing unit, and that the image erasing unit is one of a thermal head and a ceramic heater.

BRIEF DESCRIPTION OF THE DRAWINGS

FIG. 1A and FIG. 1B explain a method of forming an information recording card according to an embodiment under the present invention, in which FIG. 1A is a cross sectional view of a state before heating-pressing the information recording card according to the embodiment under the present invention, and FIG. 1B is a cross sectional view of a state after the heating-pressing.

DESCRIPTION OF THE PREFERRED EMBODIMENTS

Figure 2:
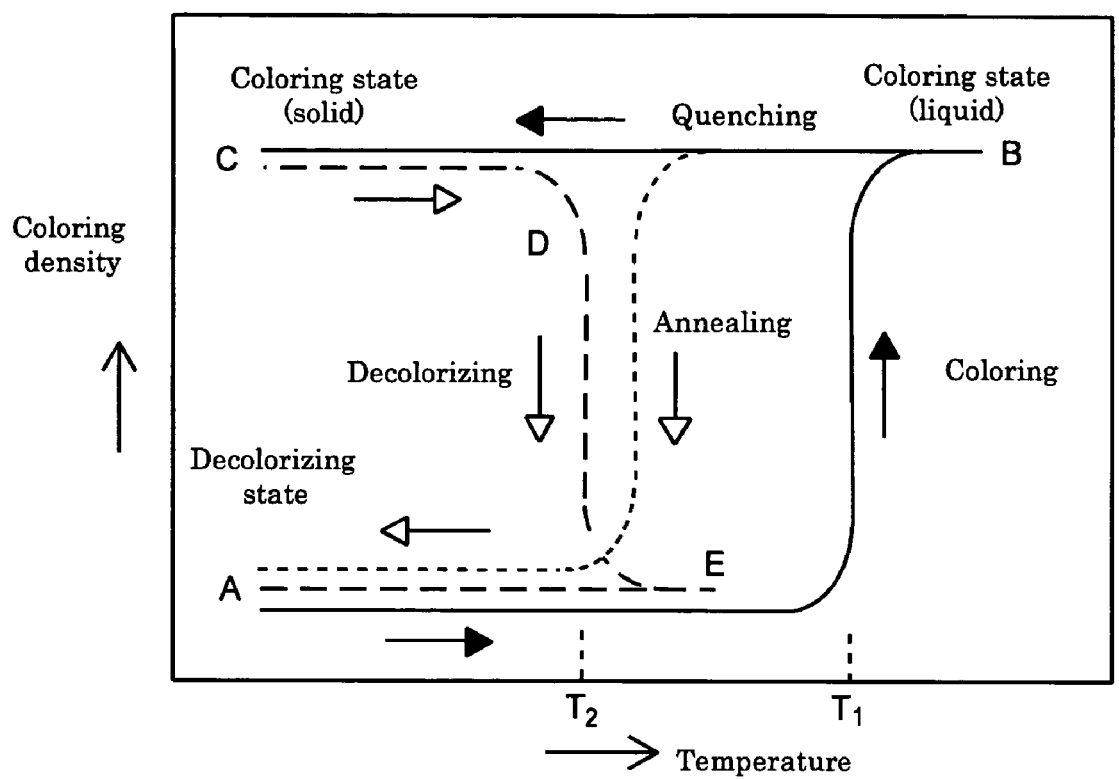
FIG. 2 shows a coloring property and a decolorizing property of a reversible thermosensitive recording medium under the present invention.

To solve the above issue, the present inventors studied repeatedly an over sheet and a core sheet which constitute an information recording-displaying card, mainly, the over sheet which is a reversible thermosensitive recording material, thus coming up with the present invention.

The above main focus on the over sheet is due to its recording material having a special property of "reversible thermosensitivity." More specific description is to be made below. The above special property of the over sheet may be influenced by a thermal energy or a mechanical energy which may be caused in a step of heating-pressing for uniting the over sheet with the core sheet, and a step of embossing the thus obtained unity. In this case, an image displaying function of the unity may be decreased or lost. The present inventors, therefore, have come up with the present invention to overcome the above possible shortcoming.

The above information recording-displaying card under the present invention may not be decreased in its function of an image displaying section, even though provided with an "emboss marking" on the over sheet through the embossing. Moreover, the above information recording-displaying card under the present invention can be subjected to another embossing after the image is displayed on the image displaying section.

The information recording-displaying card under the present invention comprises: a core sheet, an over sheet where the core sheet and the over sheet are bonded with each other. The over sheet comprises a support and a reversible thermosensitive recording layer disposed on the support, where the support comprises an amorphous polyester resin while the reversible thermosensitive recording layer comprises an electron-donating coloring compound, and an electron-accepting compound. The reversible thermosensitive recording layer is capable of relatively forming a coloring state and a decolorizing state with a difference in at least one of the following: i) a heating temperature and ii) a cooling rate after a heating. Moreover, the over sheet functions as an image displaying section and meets the following condition (A), condition (B) and condition (C). As long as having embossability on the over sheet, the information recording-displaying card under the present invention is not specifically limited. In the following condition (A), condition (B) and condition (C), "1.0 E+08" denotes "$1.0 \times 10^8$," "1.0 E+02" denotes "$1.0 \times 10^2$," and "5.0 E+07" denotes "$5.0 \times 10^7$." Moreover, the temperature of storage elasticity E' (1.0 E+08) Pa denotes a temperature for obtaining the storage elasticity of E' (1.0 E+08) Pa.

Condition (A) (over sheet's upper limit temperature for erasing image−30° C.)>(over sheet's temperature of storage elasticity E' (1.0 E+08) Pa), Condition (B) 10 μm or less of a surface waviness WCM (Maximum height of Waviness Profile), and Condition (C) 1.0 E+02 Pa≦(storage elasticity E' of reversible thermosensitive over sheet at 180° C.)≦5.0 E+07 Pa.

Hereinafter described is the condition (A), the condition (B) and the condition (C) which are, in combination, to be met by the over sheet of the information recording-displaying card which over sheet is bonded with the core sheet, under the present invention.

Condition (A) (over sheet's upper limit temperature for erasing image−30° C.)>(over sheet's temperature of storage elasticity E' (1.0 E+08) Pa)

Condition (B) 10 μm or less of surface waviness WCM

Condition (C) 1.0 E+02 Pa≦(storage elasticity E' of reversible thermosensitive over sheet at 180° C.)≦5.0 E+07 Pa The condition (A) (over sheet's upper limit temperature for erasing image−30° C.)>(temperature of storage elasticity E' (1.0 E+08) Pa) is necessary for the information recording-displaying card under the present invention to secure an excellent property of image eraseability.

The reversible thermosensitive recording material containing the leuco dye (electron-donating coloring compound) and the developing agent (electron-accepting compound) under the present invention defines, in general, an inherent image-erasing temperature range, and therefore, the upper limit temperature for erasing image is, in general, attributable to a melting point of the developing agent contained in the reversible thermosensitive recording material which is the over sheet.

The condition (A) denotes that the (over sheet's upper limit temperature for erasing image−30° C.) is needed to be more than the (over sheet's temperature of storage elasticity E' (1.0 E+08) Pa).

Especially, the over sheet's temperature of storage elasticity E' (1.0 E+08) Pa is preferably less than 140° C. for an excellent eraseability.

Under the condition (A), the above stable image eraseability is considered to be attributable to an improved adhesion between a heating unit (such as a thermal head) and the over sheet's surface.

The "over sheet's upper limit temperature for erasing image" may basically be determined by a melting point of a developing agent of a reversible thermosensitive material. Measurement thereof may be carried out in the following steps: contacting the over sheet with a hot plate of 180° C. for a rapid quenching, forming thereby a saturated coloring image, pressing thereafter by means of a heat slope tester HG-100 (made by TOYO SEIKI KOGYO CO., LTD.), more specifically, pressing heat plates (5° C. stepwise temperatures) to the over sheet under a pressure of 1 Kgf/cm for 1 second. With this, an erasable upper limit temperature can be obtained.

The "temperature of storage elasticity E' (1.0 E+08) Pa" may be calculated in the following steps: carrying out a tensile test with "Viscosity-Elasticity Spectrometer" made by IWAMOTO SEISAKUSHO, measuring temperature dispersion of a dynamic viscosity-elasticity in a range of temperature from −100° C. to 200° C. (3° C. stepwise temperatures) at a frequency of 1 Hz, and calculating the storage elasticity E' as a real number item. The temperature was obtained when the storage elasticity E' reached 1.0 E+08. The temperature of storage elasticity E' (1.0 E+08) Pa may influence the durability of the repeatedly-used information recording-displaying card, and is preferred to be relatively high, especially preferably 80° C. or more for the repetition durability.

The temperature of storage elasticity E' (1.0 E+08) Pa less than 80° C. may cause a large curl after several printing operations, which is not practically preferable.

The amorphous polyester resin used as the support constituting the over sheet under the present invention may be obtained by, for example, dehydrated-condensed body (aromatic dicarboxylic acid component with diol component). The above support made of the above amorphous polyester resin can improve flexibility when heated.

Applying a heat to the surface of the over head by means of the thermal head as an erasing-heating unit may improve flexibility of the over head, thus bettering adhesion of the over sheet to the thermal head. As a result, the image eraseability can be improved. The above flexibility is largely influenced by the support. In this case, however, the flexibly of the support may not necessarily determine the entire flexibility of the over sheet.

The condition (B) (10 μm or less of a surface waviness WCM) is necessary for the information recording-displaying card under the present invention to secure an excellent image eraseability as well as an excellent image visibility.

The surface waviness WCM of the over sheet under the present invention which sheet is provided with the reversible thermosensitive recording layer on the support may cause a large influence on the image eraseability, image visibility, and the like. Therefore, the surface waviness WCM is preferred to be as smooth as possible, specifically, about 10 μm or less. More than 10 μm may cause an insufficient adhesion between the over sheet and the heating unit, thereby decreasing the image eraseability, leading to deteriorated visibility and appearance.

The surface waviness WCM hereinabove signifies a maximum filter waviness. Specifically, in a section extracting a standard length (measurement length 5.0 mm) from a filter waviness curve, the surface waviness WCM denotes a gap between two lines (parallel to an average line) interposing therebetween the above extracted section. The value of the surface waviness WCM under the present invention denotes a measurement by a surface roughness measuring apparatus made by TOKYO SEIMITSU.

The above surface waviness is largely influenced by i) material for the support, ii) thickness of the support, iii) conditions for manufacturing the over sheet, and the like. When the amorphous polyester is used as the support of the over sheet under the present invention, drying at 100° C. or more after coating the thermosensitive recording layer on the support may be a cause for deformation. Moreover, the support using the amorphous polyester film which has high solubility in solvent may be eroded with the solution for forming the thermosensitive recording layer (namely, solutions using solvent such as MEK, toluene, ethyl acetate, THK (tetrahydrofuran) and the like which are used generally), thus deforming the support and roughing the surface of the support, which is not preferable.

The condition (C) 1.0 E+02 Pa≦(the storage elasticity E' of the reversible thermosensitive over sheet at 180° C.)≦5.0 E+07 Pa is necessary for the over sheet constituting the information recording-displaying card under the present invention to secure an excellent embossability.

As described above, in the modern society, it is practically indispensable that the credit card, the cash card and the like are marked with "emboss marking" which can be formed by embossing.

The over sheet, the core sheet and the information recording-displaying card (which is a unity of the two sheets) may influence the respective embossabilities thereof. The over sheet which is required to bring about a sufficient image-displaying function and to impart the embossability is especially important under the present invention. Thereby, the over sheet is especially studied under the present invention and conditions thereof have been determined.

Whether or not embossable depends on "softness" in the machining temperature range of the over sheet. Under the present invention, the "softness" is expressed by the storage elasticity E' of the over sheet. More specifically, it is necessary to use the over sheet having the storage elasticity E' of 5.0 E+07 Pa or less at 180° C. Meeting the above range may carry out the embossing advantageously.

Embossing with the storage elasticity E' more than 5.0 E+07 Pa at 180° C. may cause layer-to-layer peeling attributable to braking of the over sheet itself, or cause warp to the finished card.

Embossing with the storage elasticity E' less than 1.0 E+02 Pa at 180° C. may cause filming failure in the film forming, thus damaging film configuration in the forming process thereof, which is not preferable.

As described afterward, disposing a barrier layer on the support may be in need of attention, since material, thickness and the like of the barrier layer may influence the storage elasticity E'.

The storage elasticity E' of the reversible thermosensitive over sheet at 180° C. is to be measured and calculated according to its specific method.

In many cases, the embossing is carried out at 180° C. or more. With this, the over sheet is preferred to have softness to a certain extent at 180° C. time point. After studying, the present inventors have found that the over sheet having the storage elasticity E' of 5.0 E+07 Pa or less at 180° C. is sufficiently embossable.

The over sheet under the present invention is a reversible thermosensitive recording material which has at least a reversible thermosensitive recording layer on the support. The reversible thermosensitive recording layer contains an electron-donating coloring compound and an electron-accepting compound and can relatively form a coloring state and a decolorizing state, with a difference in at least one of the following: i) a heating temperature and ii) a cooling rate after the heating.

The material constituting the reversible thermosensitive recording layer and forming other layer(s), when necessary, such as a protective layer on the reversible thermosensitive recording layer can be accomplished by the known reversible thermosensitive recording material.

Hereinafter described in detail is the support of the over sheet since the support is the most influential in the embossability and the image eraseability under the present invention. Other technical points are to be followed thereafter.

In view of the embossability and the image eraseability as well as unification (adhesion and heat fusibility) of the over sheet with the core sheet, the material for the support of the over sheet under the present invention is a resin composition containing an amorphous polyester resin. Specifically, the resin composition includes i) a single type of amorphous polyester resin composition, ii) a polymer alloy resin composition of a plurality of amorphous polyester resins, iii) a polymer alloy resin composition of an amorphous polyester resin and a polycarbonate resin, iv) and the like.

Herein, the amorphous polyester resin under the present invention may be obtained by dehydrated-condensed body (aromatic dicarboxylic acid component with diol component). Moreover, the amorphous polyester resin hereinabove is free from failures such as whitening (by crystallization), fusion and the like, which may be caused in a practical heating-machining such as pressing-fusing for manufacturing the cards. Moreover, concept of the amorphous polyester resin under the present invention extensively includes those having low molecular crystal property, PBT (polybutylene terephthalate) before a crystallizing treatment, and the like.

Preferable examples of the aromatic dicarboxylic acid component becoming the raw material for the amorphous polyester resin typically include terephthalic acid, isophthalic acid, naphthalene dicarboxylic acid, and the like. Otherwise, a part of the terephthalic acid may be substituted with other dicarboxylic acid.

Examples of the other dicarboxylic acids include oxalic acid, malonic acid, succinic acid, adipic acid, azelaic acid, sebacic acid, neopentyl acid, isophthalic acid, naphthalene dicarboxylic acid, diphenyl ether dicarboxylic acid, p-oxy benzoic acid, and the like. The above other dicarboxylic acids may be used alone or in combination of two or more. Moreover, the amount of the other dicarboxylic acid to be substituted may be properly selected.

Preferable examples of the diol component becoming the raw material for the amorphous polyester resin typically include ethylene glycol, diethylene glycol, triethylene glycol, cyclohexane dimethanol, and the like. A part of the ethylene glycol may be substituted with the other diol component.

Examples of the other diol components include propylene glycol, trimethylene glycol, tetramethylene glycol, hexamethylene glycol, diethylene glycol, neopentyl glycol, polyalkylene glycol, 1,4-cyclohexane dimethanol, glycerin, pentaerythritol, trimethylol, methoxy polyalkylene glycol, and the like.

The other diol components described above may be used alone or in combination of two or more. Moreover, the amount of the other diols to be substituted may be properly selected.

Of the amorphous polyester resins under the present invention, the polyethylene terephthalate formed by polycondensation of the terephthalic acid with the ethylene glycol is preferable in view of cost. As described above, however, use of the copolymer polyester containing i) dicarboxylic acid component other than the terephthalic acid and/or ii) diol component other than the ethylene glycol is also effective for accomplishing the object of the present invention.

Examples of the copolymer polyester include the one made of a polycondensation of i) a dicarboxylic acid component (60 mol % or more part is terephthalic acid, and the remaining part is substituted with other dicarboxylic acid component) and ii) a diol component (60 mol % or more part is ethylene glycol, and the remaining part is substituted with other diol component).

Moreover, the aromatic polyester resin usable under the present invention may be a mixture of polyethylene terephthalate and the above copolymer polyester. Use of the copolymer polyester is, however, in need of carefulness since selection, content and the like of the copolymerization components may occasionally greatly change sheet's glass transition temperature and tensile elasticity.

In the case of the above mixture, the aromatic polyester resin that is substantially amorphous is preferred as a preferably used copolymer polyester, which resin is prepared by substituting about 30 mol % of ethylene glycol (of polyethylene terephthalate) with 1,4-cyclohexane dimethanol, an example thereof including "PETG," a brand of EASTMAN CHEMICAL.

The polycarbonate resin in the polymer alloy resin composition of the above polyester resin and the polycarbonate resin extensively signifies polymers having carbonate bonding (—CO—O—) for a main chain thereof.

Examples of the polycarbonate resins include i) one manufactured from bisphenol A (which is synthesized by phenol and acetone) through an interfacial polymerization, transesterification, a pyridine method and the like, ii) polyester carbonate obtained by copolymerization of bisphenol A and dicarboxylic acid derivative (for example, terephthalic acid (or isophthalic acid) dichloride and the like), and iii) one obtained by polymerization of bisphenol A derivative (for example, tetramethyl bisphenol A and the like).

Having the required function as support, the support of the over sheet under the present invention is not limited to a single-layer film, in other words, a multilayer body (two or more layers) constituted of amorphous polyester resin film and other type of film is allowed.

For example, such a multilayer structure is allowed as has i) an inner layer on a first side for the reversible thermosensitive recording layer and ii) an outer layer on a second side for heating-pressing (fusion) with the core sheet. In this structure, the resin constituting the outer layer is preferred to have a melting temperature lower than that of the resin constituting the inner layer, so as to effectively improve the card's heat resistance without losing low temperature fusibility.

More specifically, a double-layer sheet having the outer layer made of polyester resin and the inner layer made of polymer alloy resin composition (amorphous polyester resin and polycarbonate resin) may bring about heat resistance, satisfy heat fusibility with the core sheet, and have excellent embossability.

Moreover, such a support film may be used as, when necessary, contains additives such as colorant, lubricant, filler, impact improver and the like. The support film, especially, blended with i) a plate-shaped filler such as talc, and ii) a tensile-strength reducing polymer such as polybutylene terephthalate can be preferably used for improving embossability.

Thickness of the support constituting the over sheet depends on thickness of the information recording-displaying card to be manufactured, in general, however, preferably in a range from 50 $\mu$m to 200 $\mu$m, and more preferably in a range from 75 $\mu$m to 150 $\mu$m.

Hereinafter described is the core sheet used under the present invention.

The core sheet used under the present invention is defined as the one for forming the information recording-displaying card by bonding the over sheet to the surface of the core sheet into a unity. Ordinarily, the core sheet is shaped into a rectangular plate, and is made of resin. The core sheet may be, when necessary, of multilayer structure.

The core sheet may encapsulate an information storing section. A magnetic information storing section may be bonded to or embedded in a single resin sheet; while an information storing section which is an IC chip, an antenna coil and the like may be mated in a gap formed in a thick resin sheet, or may be sandwiched between a plurality of resin sheets.

The core sheet having the information storing section disposed in the above manners may be complicated and require labor forces for disposing the magnetic tape and the like or for positioning the IC chip and the like. However, to the above operations, the conventional technology is applicable which is used for the information recording card free from the image displaying section.

The core sheet under the present invention is preferred to have thickness in a range from 100 $\mu$m to 800 $\mu$m, more preferably in a range from 200 $\mu$m to 600 $\mu$m.

The material for the core sheet under the present invention is preferred to be thermoplastic resin that is deformable by heating-pressing and shaped substantially into a sheet. It is important for the core sheet to have fusibility with the support film of the over sheet by the heating-pressing. For obtaining high adhesion to the over sheet, the core sheet is preferred to use a resin of the same (common) type as that of the over sheet at least in its surface layer section contacting the over sheet. Examples of the above same (common) resin include amorphous polyester resin, polycarbonate resin, and the like.

Preferable examples of the thermoplastic resins include amorphous polyester resin, polycarbonate resin, and an alloy (of polycarbonate resin and amorphous polyester resin). Not limited to the above, general-purpose resins such as polyolefine resin, crystal polyester resin, acrylic resin, ABS resin, AS resin, biodegradable resin and the like are also usable.

An engineering plastic having a good heat resistance may also be used as the core sheet material. Examples of the engineering plastics include polyphenylene sulfide, polyetherimide, polyimide, poly ether ether ketone, and the like. Films or sheets having, as main component thereof, the above material(s) (one type, or two or more types) can be preferably used.

Not limited to the adhesion, for bringing about a plurality of functions such as heat resistance and the like, the core sheet is preferred to be of a multilayer structure (two layers or more). In this case, the core sheet having two or more layers can be prepared in advance, followed by pressing by overlapping with the over sheet. In this case, otherwise, a plurality of the prepared core sheets can be overlapped with the over sheet in heating-pressing for fusion.

Examples of forming three-layer core sheet may include the following i) and ii): i) 1. amorphous polyester resin, 2. polycarbonate resin, and 3. amorphous polyester resin; and ii) 1. amorphous polyester resin, 2. alloy of polycarbonate resin and amorphous polyester resin, and 3. amorphous polyester resin. The above amorphous polyester of the outer layer can bring about a low-temperature adhesion, the above intermediate layer, that is, the polycarbonate resin or the alloy of the polycarbonate resin and the amorphous polyester resin can bring about heat residence.

Hereinabove, the amorphous polyester resin for the outer layer includes i) amorphous polyester resin alone or ii) an alloy product having amorphous polyester resin as a main component thereof while the intermediate polycarbonate resin includes i) polycarbonate resin alone or ii) an alloy product having polycarbonate resin as a main component thereof. Depending on the object, thickness of the outer layer and the intermediate layer can be arbitrarily determined.

The core sheet is preferred to be any one of being transparent, semi-transparent and opaque, otherwise, may be white or colored chromatic. Depending on the application, the core sheet may be properly designed.

For making a semi-transparent film and an opaque film, an inorganic pigment or an organic pigment may be blended with the resin of the core sheet. For making a transparent film, a certain amount of pigment may be blended as long as the transparency is not damaged.

In the core sheet, various additives other than the above pigments may be blended such as plasticizer, charge preventing agent, and the like.

The surface of the core sheet is preferred to be subjected to embossing and the like for degassing in a joining.

Under the present invention, the methods of manufacturing the support of the over sheet, and manufacturing the film of the core sheet are not specifically limited, and therefore those conventionally known can be used.

For forming the support (of the over sheet) and the film (of the core sheet) each of which is of a single-layer structure, the resin composition is to be subjected to an extrusion with a T-die. For forming the support (of the over sheet) and the film (of the core sheet) at least one of which is of a multilayer structure; i) the resin composition of each layer is to be subjected to a coextrusion for laminating, or ii) each layer is to be made into a sheet followed by the laminating. In view of productivity as well as cost, however, the coextrusion is preferred for forming the layer.

Specifically, in the case of the single layer, the resin composition is blended or, when necessary, is shaped into a pellet to be inputted into a hopper of the T-die extruder. Then, the resin composition is melted in a range of temperature from 200° C. to 280° C., extruded, cooled with a cooling roll and the like for solidification, to thereby form a sheet.

In the case of the multilayer, the resin composition of each layer is blended or, when necessary, is shaped into a pellet to be inputted into one of the respective hoppers of the T-die extruder having a plurality of T-dies coupled therewith. Then, the resin compositions are melted in a range of temperature from 200° C. to 280° C., co-extruded, rapidly cooled with a cooling roll and the like for solidification, to thereby form laminated sheets.

For causing a high adhesion to the bonded product of the over sheet with the core sheet (pressing, laminating), at least the respective surface layers thereof contacting each other are preferred to be made of the same kind of resin.

Thickness of the over sheet and the core sheet is to be determined based on thickness of the card to be manufactured.

For manufacturing a card having thickness of 760 $\mu$m specified in JIS X 6301, for example, the over sheet having thickness of 50 $\mu$m to 250 $\mu$m and the core sheet having thickness of 50 $\mu$m to 700 $\mu$m can be so combined that they can form a certain card thickness.

For accomplishing the certain thickness, a plurality of the core sheets may be used. In the case of the non-contact IC card encapsulating therein the IC chip or the antenna, the thickness of the core sheet may be determined based on the size of the IC chip or the antenna.

In this case, the over sheet having thickness of 50 $\mu$m to 200 $\mu$m and the core sheet having thickness of 50 $\mu$m to 400 $\mu$m are preferable. Especially, for the over sheet having thickness of 100 $\mu$m, combining two core sheets each having thickness of 280 $\mu$m is preferred.

Hereinafter described is a method of producing the information recording-displaying card by bonding the over sheet to the core sheet, as described above.

The term "boding" under the present invention denotes unification, by using adhesive, heating-pressing (for thermal fusion), and the like.

FIG. 1A and FIG. 1B show schematics of a state for manufacturing the information recording-displaying card by heating-pressing the over sheet and the core sheet, using two core sheets and an outer layer sheet.

An over sheet 10 is sequentially provided with a support 1, a barrier layer 2 on the support 1, a reversible thermosensitive recording layer 3 and a protective layer 4.

Two core sheets 5 are so disposed as to be sandwiched between the over sheet 10 and an outer layer sheet 6, then a surface side of the protective layer 4 of the over sheet 10 and a surface side of the outer layer sheet 6 are to be further sandwiched between pressing plates for heating-pressing, to thereby thermally fuse the thus sandwiched.

In this example, the outer layer sheet 6 and the two core sheets 5 are united, thereby become part of the information recording-displaying card. The information recording-displaying card under the present invention is, however, not limited to have the structure described above.

For example, in FIG. 1A and FIG. 1B, a sheet (referred to as inlet sheet) having a non-contact IC chip provided with an antenna coil may be sandwiched between the two core sheets 5, and the outer layer sheet 6 to which a magnetic stripe layer is temporarily transferred in advance may be used. With this, the heating-pressing is to be carried out like that described above, to thereby form an IC card layered body which is provided with the IC chip.

The thus formed unit is subjected to a punching (using a punch and the like) into a card configuration having a certain size, to thereby prepare the information recording-displaying card.

The heating-pressing includes a pressing method, a laminating method and the like. The heating-pressing is, however, not limited to the above, and may be used differentiatedly with the sheet material and the like to be used.

A large core sheet and an over sheet which has a certain area and is disposed on the large core sheet may be subjected to the heating-pressing, otherwise, a tape-shaped core sheet and a tape-shaped over sheet may be rolled for unification to be subjected to the heating-pressing. In sum, the method of manufacturing the information recording-displaying under the present invention is not specifically limited.

Having the fusibility to the core sheet by the heating-pressing, the outer layer sheet is not specifically limited. In this case, however, the outer layer sheet is ordinarily smaller in thickness than the core sheet, and may be made of the materials selected from those for the support constituting the over sheet. Moreover, the outer layer sheet may have the same material as that of the support constituting the over sheet.

For manufacturing, by the heating-fusing, the conventional information recording card that is free from the reversible thermosensitive recording layer, the outer layer sheet is generally used. An outer layer sheet under the present invention may be selected from the above conventional outer layer sheet.

The terms "over sheet" and the "core sheet" under the present invention denote respective positions in a state in which the core sheet is sandwiched between the over sheet and the outer layer sheet. The information recording-displaying card under the present invention may omit the outer layer sheet, depending on the method, in other words, the information recording-displaying card under the present invention includes those free from the outer layer sheet.

Described hereinafter is a heating-pressing process.

A temperature in the heating-pressing (referred to as pressing temperature) over the melting point of the developing agent may cause a texture fog (or background fog), therefore the above temperature is preferred to be equal to or less than the melting point of the developing agent.

The pressure in the heating-pressing (pressing pressure) too high may decrease a matting tone of the card's surface thus causing gloss or may break the surface layer thus causing stick, which are problematical.

For forming the card without influencing the special property "reversible thermosensitivity," the upper limit of the pressing temperature is preferred to be 160° C. or less, more preferably 150° C. or less and especially preferably 140° C. or less. Pressing at the pressing temperature more than the melting point of the developing agent or at more than 160° C. may cause the texture fog (or background fog) attributable to the developing agent and the dye, or may cause yellowing, which are problematical.

On the other hand, a lower limit of the pressing temperature is preferred to be 100° C. or more, especially preferably 120° C. or more. Less than 100° C. hereinabove is likely to cause an insufficient fusion thus leading to peeling, which is problematical.

An upper limit of the pressing pressure is preferred to be 40 kg/cm$^2$ or less, especially preferably 30 kg/cm$^2$ or less. More than 40 kg/cm$^2$ hereinabove may cause breakage of the base material or the IC chip, which is problematical.

On the other hand, a lower limit of the pressing pressure is preferred to be 5 kg/cm$^2$ or more, especially preferably 10 kg/cm$^2$ or more. Less than 5 kg/cm$^2$ hereinabove is likely to cause an insufficient pressing-adhesion thus leading to peeling, which is problematical.

The heating-pressing time is preferably 5 minutes to 20 minutes.

Preparing the information recording-displaying card having the "emboss marking" through the embossing can actively make use of the following features of the present invention.

More specifically about this: The over sheet under the present invention is embossable. Therefore, in combining the over sheet with the core sheet which is also embossable, the over sheet and the core sheet may have substantially the same size with each other, which is advantageous.

With this, the over sheet may be bonded to substantially an entire face of the core sheet. The thus prepared information recording-displaying card can be embossable from an upper portion of the over sheet. Therefore, the image displaying section expressing a primary function of the over sheet and the "emboss marking" by the embossing can each have a broadened freedom in terms of sizing and positioning, which is an advantage not expected from the conventional information recording-displaying card.

Moreover, the over sheet to be bonded may be smaller in size than the core sheet. In this case, however, preparation of the over sheet having different size and bonding the over sheet to a certain position on the core sheet are needed. In other words, positioning accuracy is needed for the bonding, causing the shortcoming in the productivity as the conventional information recording-displaying card.

As long as the image displaying function is not influenced, the above information recording-displaying card having the over sheet whose area is small is, however, embossable without avoiding the over sheet or even with an interference with the over sheet. This feature of the present invention is an excellent advantage not found in the conventional product, in terms of function and production of the information recording-displaying card itself.

As a matter of course, the information recording-displaying card under the present invention may also allow the over sheet to be bonded to a certain position, like the conventional product, to thereby carry out the embossing by avoiding the over sheet. Even in this case, the information recording-displaying card under the present invention can have a high repetition durability, which is more advantageous than the conventional product.

In the reversible thermosensitive recording material which is the over sheet under the present invention, the heating temperature and/or the cooling rate after the heating can relatively form a coloring state and a decolorizing state. Hereinafter described is a basic coloring-decolorizing phenomenon of a composition made of the coloring coupler and the developing agent under the present invention.

FIG. 2 shows features of the recording medium including coloring density relative to a temperature. Increasing the temperature of the recording medium which is initially in a decolorizing state (A) may color the recording medium at a melt-starting temperature $T_1$, to thereby cause a melted coloring state (B). Rapidly quenching the recording medium from the melted coloring state (B) can reduce the recording medium to a room temperature with the recording medium kept in the coloring state, to thereby cause a solid coloring state (C). Whether or not this coloring state is obtained depends on the rate of reducing the temperature from the melted state. Specifically, annealing (slow cooling) may cause the decolorizing in the step of decreasing the temperature, thus forming i) the initial decolorizing state (A) or ii) a state in which the density is relatively lower than the rapidly-quenched coloring state (C).

On the other hand, increasing the temperature again from the rapidly-quenched coloring state (C) may cause the decolorizing at a temperature $T_2$ (from D to E) lower than the coloring temperature. Reducing the temperature from this point may return to the initial decolorizing state (A). Being variable with the combination of the developing agent and the coloring coupler, an actual coloring temperature and an actual decolorizing temperature can be selected according to the object. The density in the melted coloring state and the density in the rapidly-quenched coloring state are not necessarily be in concord with each other, but may differ from each other.

With the reversible thermosensitive recording material which is the over sheet under the present invention, the rapidly-quenched coloring state (C) obtained through the rapid quenching from the melted state is a mixed state in which molecules of the developing agent and molecules of the coloring coupler can have a contact reaction with each other, which state is so often in a form of solid. This state may cohere the developing agent with the coloring coupler, and thereby keeps the coloring. Forming this cohesion structure can stabilize the coloring.

On the other hand, in the decolorizing state, a phase separation between the developing agent and the coloring coupler is caused. Specifically, in the decolorizing state, the molecules of the compound of at least one of the developing agent and the coloring agent may so gather as to form a domain or as to be crystallized, in other words, the cohering or the crystallizing can separate the coloring coupler from the developing agent, thus causing a stable state. In many cases under the present invention, the coloring coupler and the developing agent may cause the phase separation from each other, with the developing agent crystallized, to thereby cause a complete decolorizing. As is seen in FIG. 2, i) the decolorizing from the melted state by the annealing (slow cooling) and ii) the decolorizing from the coloring state by the increased temperature may change the cohesion structure at this temperature, causing the phase separation and the crystallization of the developing agent.

For forming the coloring image on the reversible thermosensitive recording material which is the over sheet under the present invention, the following steps 1) and 2) may be taken: 1) once heating, by using a thermal head and the like, the reversible thermosensitive recording material to a temperature for melting-mixing, 2) then rapidly quenching the reversible thermosensitive recording material. The decolorizing can be carried out by the following two: i) annealing (slow cooling) from a heated state, and ii) heating to a temperature slightly lower than the coloring temperature. The above two, however, are substantially the same in that the coloring coupler and the developing agent cause the phase separation from each other and that at least one of the coloring coupler and the developing agent is temporarily kept at the crystallizing temperature. The rapid quenching in forming the coloring state is for preventing keeping of the phase separation temperature or of the crystallizing temperature. Herein, the rapid quenching and the annealing (slow cooling) are relative to each other with respect to one composition, the boundary therebetween varying with the combination of the coloring coupler and the developing agent.

Hereinafter described is a technical matter, other than the support described above, of the reversible thermosensitive recording material which is the over sheet under the present invention.

Disposing the reversible thermosensitive recording layer directly on the support is allowed. In this case, however, depending on the solvent constituting the coating solution for forming the reversible thermosensitive recording layer, the support may be so eluted to be deformed, be shrunk or be reduced in strength, thus damaging the function of the over sheet. In the above case, it is preferred to first provide the barrier layer on the support and then form the reversible thermosensitive layer on the barrier layer.

Method of forming the barrier layer include i) coating a material that is excellent in solvent resistance, and ii) laminating a film that is excellent in solvent resistance.

Method 1. Coating Material Excellent in Solvent Resistance

The barrier layer is preferred to be made of a material having resistance to a solvent of a coating solution for forming the reversible thermosensitive recording layer.

In view of machinability, such a resin is preferred as is soluble or dispersible in an alcohol solvent, water and the like. The material for the barrier layer is preferred to increase barring property against organic solvent when being set by heat, light and the like.

Specific examples of the barrier layer preferably include polyamide resin, polyvinyl alcohol resin, alcohol soluble phenol resin, polyester resin, acrylic resin and the like.

Moreover, the examples of the useful materials for the barrier layer include i) polyurethane resin formed by crosslinking of acrylic polyol, polyester polyol and the like with isocyanate, ii) thermosetting resin such as epoxy resin and the like, iii) ultraviolet setting resin or electron beam setting resin made by properly blending a material having, as main component thereof, oligomer (for example, urethane acrylate, epoxy acrylate and the like) with various acrylate monomers and other additives.

The above materials may be solved or dispersed in water, alcohol solvent and the like.

Thickness of the barrier layer formed in the method 1 is preferably in a range from 0.1 $\mu$m to 10 $\mu$m.

Method 2. Laminating Film Excellent in Solvent Resistance

For allowing the barrier layer to have the solvent resistance, a polyester film crystallized can be used. The method of crystallization include i) drawing the polyester film in the forming of the film, and ii) heating the polyester film after forming an amorphous polyester film. Generally used is the former method of drawing the polyester film, specifically, drawing PET film or drawing PEN film.

For improving adhesion of the barrier layer to the support and to the recording layer, it is preferable to apply an adhesive layer to a surface or a backface of the thus crystallized polyester film or to subject the thus crystallized polyester film to a surface treatment with a corona discharge and the like.

Many of the barrier layers thus obtained have high solvent resistance and high tensile strength. Thereby, thicker barrier layer may be influenced by the tensile strength, thereby decreasing the embossability. Therefore, the barrier layer is preferred to have thickness in a range from 1.0 $\mu$m to 8 $\mu$m, depending on the material therefor.

Stated below, for example, is a support using an amorphous polyester sheet having thickness of 100 $\mu$m, with a drawing PET film laminated. In this case, the storage elasticity of the drawing PET film at 180° C. is higher than that of the amorphous polyester sheet. With this, the PET film having thickness of 38 $\mu$m which may have the storage elasticity of 8.3 E+07 ($8.3 \times 10^7$) Pa at 180° C. is likely to cause a failure after the embossing.

On the other hand, thickness of 8 $\mu$m or thickness of 4.5 $\mu$m may bring about, respectively, 4.9 E+07 ($4.9 \times 10^7$) Pa and 2.4 E+07 ($2.4 \times 10^7$) Pa, thus making the embossing easier.

Described below is the reversible thermosensitive recording layer of the reversible thermosensitive recording material.

The reversible thermosensitive recording layer is preferred to have film thickness in a range from 1 $\mu$m to 20 $\mu$m, more preferably from 3 $\mu$m to 15 $\mu$m.

Examples of the leuco dyes (electron-donating coloring compound) used for the reversible thermosensitive recording layer of the reversible thermosensitive recording material are described below, but not limited thereto. The leuco dyes described hereinafter may be used alone or in combination.

2-anilino-3-methyl-6-diethyl amino fluoran, 2-anilino-3-methyl-6-di(N-butyl amino) fluoran, 2-anilino-3-methyl-6-(N-n-propyl-N-methyl amino) fluoran, 2-anilino-3-methyl-6-(N-isopropyl-N-methyl amino) fluoran, 2-anilino-3-methyl-6-(N-isobutyl-N-methyl amino) fluoran, 2-anilino-3-methyl-6-(N-n-amyl-N-methyl amino) fluoran, 2-anilino-3-methyl-6-(N-sec-butyl-N-methyl amino) fluoran, 2-anilino-3-methyl-6-(N-n-amyl-N-ethyl amino) fluoran, 2-anilino-3-methyl-6-(N-iso-amyl-N-ethyl amino) fluoran, 2-anilino-3-methyl-6-(N-n-propyl-N-isopropyl amino) fluoran, 2-anilino-3-methyl-6-(N-cyclohexyl-N-methyl amino) fluoran, 2-anilino-3-methyl-6-(N-ethyl-p-toluidino) fluoran, 2-anilino-3-methyl-6-(N-methyl-p-toluidino) fluoran, 2-(m-trichloro methyl anilino)-3-methyl-6-diethyl amino fluoran, 2-(m-trifluoro methyl anilino)-3-methyl-6-diethyl amino fluoran, 2-(m-trichloro methyl anilino)-3-methyl-6-(N-cyclohexyl-N-methyl amino) fluoran, 2-(2,4-dimethyl anilino)-3-methyl-6-diethyl amino fluoran, 2-(N-ethyl-p-toluidino)-3-methyl-6-(N-ethyl anilino) fluoran, 2-(N-ethyl-p-toluidino)-3-methyl-6-(N-propyl-p-toluidino) fluoran, 2-anilino-6-(N-n-hexyl-N-ethyl amino) fluoran, 2-(o-chloro anilino)-6-diethyl amino fluoran, 2-(o-chloro anilino)-6-dibutyl amino fluoran, 2-(m-trifluoro methyl anilino)-6-diethyl amino fluoran, 2,3-dimethyl-6-dimethor amino fluoran, 3-methyl-6-(N-ethyl-p-toluidino) fluoran, 2-chloro-6-diethyl amino fluoran, 2-bromo-6-diethyl amino fluoran, 2-chloro-6-dipropyl amino fluoran, 3-chloro-6-cyclohexyl amino fluoran, 3-bromo-6-cyclohexyl amino fluoran, 2-chloro-6-(N-ethyl-N-isoamyl amino) fluoran, 2-chloro-3-methyl-6-diethyl amino fluoran, 2-anilino-3-chloro-6-diethyl amino fluoran, 2-(o-chloro anilino)-3-chloro-6-cyclohexyl amino fluoran, 2-(m-trifluoro methyl anilino)-3-chloro-6-diethyl amino fluoran, 2-(2,3-dichloro anilino)-3-chloro-6-diethyl amino fluoran, 1,2-benzo-6-diethyl amino fluoran, 3-diethyl amino-6-(m-trifluoro methyl anilino) fluoran, 3-(1-ethyl-2-methyl indole-3-yl)-3-(2-ethoxy-4-diethyl amino phenyl)-4-azaphthalide, 3-(1-ethyl-2-methyl indole-3-yl)-3-(2-ethoxy-4-diethyl amino phenyl)-7-azaphthalide, 3-(1-octyl-2-methyl indole-3-yl)-3-(2-ethoxy-4-diethyl amino phenyl)-4-azaphthalide, 3-(1-ethyl-2-methyl indole-3-yl)-3-(2-methyl-4-diethyl amino phenyl)-4-azaphthalide, 3-(1-ethyl-2-methyl indole-3-yl)-3-(2-methyl-4-diethyl amino phenyl)-7-azaphthalide, 3-(1-ethyl-2-methyl indole-3-yl)-3-(4-diethyl amino phenyl)-4-azaphthalide, 3-(1-ethyl-2-methyl indole-3-yl)-3-(4-N-n-amyl-N-methyl amino phenyl)-4-azaphthalide, 3-(1-methyl-2-methyl indole-3-yl)-3-(2-hexyloxy-4-diethyl amino phenyl)-4-azaphthalide, 3,3-bis(2-ethoxy-4-diethyl amino phenyl)-4-azaphthalide, 3,3-bis(2-ethoxy-4-diethyl amino phenyl)-7-azaphthalide.

Other than the fluoran compounds and the azaphthalide compounds described above, the conventional leuco dye can be used alone or in combination, as the coloring coupler under the present invention. Examples of the other coloring couplers are described below.

2-(p-acetyl anilino)-6-(N-n-amyl-N-n-butyl amino) fluoran, 2-benzil amino-6-(N-ethyl-p-toluidino) fluoran, 2-benzil amino-6-(N-methyl-2,4-dimethyl anilino) fluoran, 2-benzil amino-6-(N-ethyl-2,4-dimethyl anilino) fluoran, 2-benzil amino-6-(N-methyl-p-toluidino) fluoran, 2-benzil amino-6-(N-ethyl-p-toluidino) fluoran, 2-(di-p-methyl benzil amino)-6-(N-ethyl-p-toluidino) fluoran, 2-(a-phenylethyl amino)-6-(N-ethyl-p-toluidino) fluoran, 2-methyl amino-6-(N-methyl anilino) fluoran, 2-methyl amino-6-(N-ethyl anilino) fluoran, 2-methyl amino-6-(N-propyl anilino) fluoran, 2-ethyl amino-6-(N-methyl-p-toluidino) fluoran, 2-methyl amino-6-(N-methyl-2,4-dimethyl anilino) fluoran, 2-ethyl amino-6-(N-ethyl-2,4-dimethyl anilino) fluoran, 2-dimethyl amino-6-(N-methyl anilino) fluoran, 2-dimethyl amino-6-(N-ethyl anilino) fluoran, 2-diethyl amino-6-(N-methyl-p-toluidino) fluoran, 2-diethyl amino-6-(N-ethyl-p-toluidino) fluoran, 2-dipropyl amino-6-(N-methyl anilino) fluoran, 2-dipropyl amino-6-(N-ethyl anilino) fluoran, 2-amino-6-(N-methyl anilino) fluoran, 2-amino-6-(N-ethyl anilino) fluoran, 2-amino-6-(N-propyl anilino) fluoran, 2-amino-6-(N-methyl-p-toluidino) fluoran, 2-amino-6-(N-ethyl-p-toluidino) fluoran, 2-amino-6-(N-propyl-p-toluidino) fluoran, 2-amino-6-(N-methyl-p-ethyl anilino) fluoran, 2-amino-6-(N-ethyl-p-ethyl anilino) fluoran, 2-amino-6-(N-propyl-p-ethyl anilino) fluoran, 2-amino-6-(N-methyl-2,4-dimethyl anilino) fluoran, 2-amino-6-(N-ethyl-2,4-dimethyl anilino) fluoran, 2-amino-6-(N-propyl-2,4-dimethyl anilino) fluoran, 2-amino-6-(N-methyl-p-chloro anilino) fluoran, 2-amino-6-(N-ethyl-p-chloro anilino) fluoran, 2-amino-6-(N-propyl-p-chloro anilino) fluoran, 1,2-benzo-6-(N-ethyl-N-isoamyl amino) fluoran, 1,2-benzo-6-dibutyl amino fluoran, 1,2-benzo-6-(N-methyl-N-cyclohexyl amino) fluoran, 1,2-benzo-6-(N-ethyl-N-toluidino) fluoran, and the like.

Specific examples of the other coloring couplers preferably used under the present invention are described below.

2-anilino-3-methyl-6-(N-2-ethoxy propyl-N-ethyl amino) fluoran, 2-(p-chloro anilino)-6-(N-n-octyl amino) fluoran, 2-(p-chloro anilino)-6-(N-n-palmityl amino) fluoran, 2-(p-chloro anilino)-6-(di-N-octyl amino) fluoran, 2-benzoyl amino-6-(N-ethyl-p-toluidino) fluoran, 2-(o-methoxy benzoyl amino)-6-(N-methyl-p-toluidino) fluoran, 2-dibenzil amino-4-methyl-6-diethyl amino fluoran, 2-dibenzil amino-4-methoxy-6-(N-methyl-p-toluidino) fluoran, 2-dibenzil amino-4-methyl-6-(N-ethyl-p-toluidino) fluoran, 2-(α-phenylethyl amino)-4-methyl-6-diethyl amino fluoran, 2-(p-toluidino)-3-(t-butyl)-6-(N-methyl-p-toluidino) fluoran, 2-(o-methoxy carbonyl amino)-6-diethyl amino fluoran, 2-acetyl amino-6-(N-methyl-p-toluidino) fluoran, 4-methoxy-6-(N-ethyl-p-toluidino) fluoran, 2-ethoxy ethyl amino-3-chloro-6-dibutyl amino fluoran, 2-dibenzil amino-4-chloro-6-(N-ethyl-p-toluidino) fluoran, 2-(α-phenylethyl amino)-4-chloro-6-diethyl amino fluoran, 2-(N-benzil-p-trifluoro methyl anilino)-4-chloro-6-diethyl amino fluoran, 2-anilino-3-methyl-6-pyrrolidino fluoran, 2-anilino-3-chloro-6-pyrrolidino fluoran, 2-anilino-3-methyl-6-(N-ethyl-N-tetrahydro furfuryl amino) fluoran, 2-mesidino-4',5'-benzo-6-diethyl amino fluoran, 2-(m-trifluoro methyl anilino)-3-methyl-6-pyrrolidino fluoran, 2-(α-naphthyl amino)-3,4-benzo-4'-bromo-6-(N-benzil-N-cyclohexyl amino) fluoran, 2-piperidino-6-diethyl amino fluoran, 2-(N-n-propyl-p-trifluoro methyl anilino)-6-morpholino fluoran, 2-(di-N-p-chloro phenyl-methyl amino)-6-pyrrolidino fluoran, 2-(N-n-propyl-m-trifluoro methyl anilino)-6-morpholino fluoran, 1,2-benzo-6-(N-ethyl-N-n-octyl amino) fluoran, 1,2-benzo-6-diallyl amino fluoran, 1,2-benzo-6-(N-ethoxy ethyl-N-ethyl amino) fluoran, benzoleuko methylene blue, 2-[3,6-bis(diethyl amino)-7-(o-chloro anilino) xanthyl] benzoic acid lactam, 2-[3,6-diethyl amino)-9-(o-chloro anilino) xanthyl] benzoic acid lactam, 3,3-bis(p-dimethyl amino phenyl)-phthalide, 3,3-bis(p-dimethyl amino phenyl)-6-dimethyl amino phthalide (otherwise, referred to as crystal violet lactone), 3,3-bis-(p-dimethyl amino phenyl)-6-diethyl amino phthalide, 3,3-bis-(p-dimethyl amino phenyl)-6-chloro phthalide, 3,3-bis-(p-dibutyl amino phenyl) phthalide, 3-(2-methoxy-4-dimethyl amino phenyl)-3-(2-hydroxy-4,5-dichloro phenyl) phthalide, 3-(2-hydroxy-4-dimethyl amino phenyl)-3-(2-methoxy-5-chloro phenyl) phthalide, 3-(2-hydroxy-4-dimethoxy amino phenyl)-3-(2-methoxy-5-chloro phenyl) phthalide, 3-(2-hydroxy-4-dimethyl amino phenyl)-3-(2-methoxy-5-nitro phenyl) phthalide, 3-(2-hydroxy-4-diethyl amino phenyl)-3-(2-methoxy-5-methyl phenyl) phthalide, 3-(2-methoxy-4-dimethyl amino phenyl)-3-(2-hydroxy-4-chloro-5-methoxy phenyl) phthalide, 3,6-bis(dimethyl amino) fluorene spiro(9,3')-6'-dimethyl amino phthalide, 6'-chloro-8'-methoxy-benzo indolino-spiropyran, 6'-bromo-2'-methoxy-benzo indolino-spiropyran, and the like.

Hereinafter described is the developing agent (electron-accepting compound) used in combination with the coloring coupler.

JP-A No. 5-124360 described above discloses a typical example of an organic phosphoric acid, an aliphatic carboxylic acid compound or a phenol compound which have a long-chain aliphatic hydrocarbon radical. In addition, JP-A No. 5-124360 discloses a compound having in combination i) a structure having developability of coloring the coloring coupler in the molecule and ii) a structure of controlling cohesive force between the molecules. Examples of the structure having the developability include phenol hydroxyl group, carboxyl group, phosphoric acid group and the like, but not limited thereto, as long as a group that is capable of coloring the coloring coupler is included. Specifically, the above groups may include a thiocarbamide group, a carboxylic metal group, and the like.

A typical example of the structure controlling the cohesive force between molecules include hydrocarbon radical such as a long-chain alkyl group and the like. Preferably, the hydrocarbon radical may have 8 or more carbon atoms, so as to obtain a good coloring property and a good decolorizing property. The hydrocarbon radical may contain an unsaturated bond or may encapsulate a branched hydrocarbon radical. In this case, the main chain portion is preferred to have 8 or more carbon atoms.

The developing agent as described above has a structure in which the structure having developability is bonded with a structure controlling the cohesive force between the molecules (namely, a structure such as hydrocarbon radical). To the above bonding portion, a bivalent group including hetero atom, or a combination of a plurality of the bivalent groups may be sandwichedly bonded.

Hereinafter described are specific examples of the developing agent used under the present invention. The developing agent may be used alone or in combination of two or more.

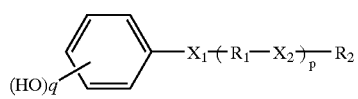

In the above formula, $X_1$ denotes a bivalent group including hetero atom, or a direct bonding hand. $X_2$ denotes a bivalent group including hetero atom. $R_1$ denotes a bivalent hydrocarbon radical. $R_2$ denotes a hydrocarbon radical having 1 to 22 carbon atoms. p denotes an integer from 0 to 4. The $R_1$ and the $X_2$ which are repeated when p is 2 to 4 may be the same or different. q denotes 1 to 3.

Specifically, $R_1$ and $R_2$ denote a hydrocarbon radical which is allowed to have a substitutional group. $R_1$ and $R_2$ may be i) an aliphatic hydrocarbon radical, ii) an aromatic hydrocarbon radical, and iii) a combination of the aliphatic hydrocarbon radical and the aromatic hydrocarbon radical.

The aliphatic hydrocarbon radical may be a straight chain or a branched chain, or may have an unsaturated bond. The substitutional group adhering to the hydrocarbon radical include hydroxyl group, halogen, alkoxy group and the like. $R_1$ may be a direct bonding hand.

Sum of the carbon atom(s) of $R_1$ and the carbon atom(s) of $R_2$ is preferred to be 8 or more, more preferably 11 or more, since 7 or less hereinabove may decrease coloring stability and decolorizing property. Each of $X_1$ and $X_2$ denotes a bivalent group including hetero atom, preferably denotes a bivalent group having at least one group expressed by the formulas 1.

[Formulas 1]

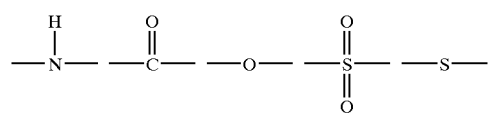

Specific examples of $X_1$ and $X_2$ are described in the formulas 2.

[Formulas 2]

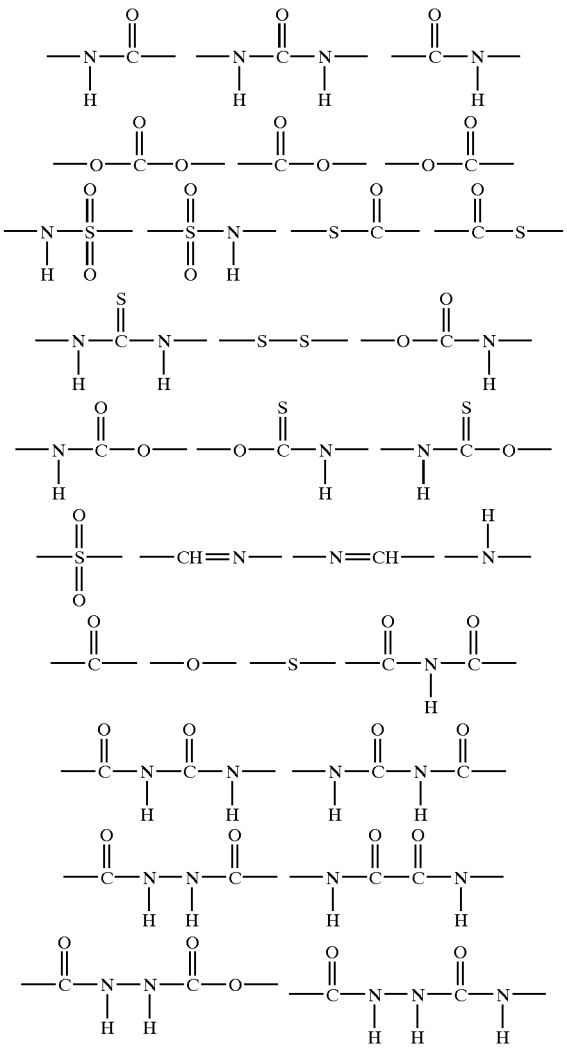

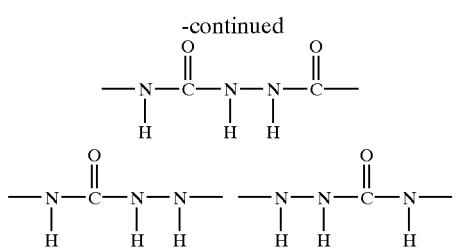

Hereinafter described in the following formulas 3 are specific examples of the phenol compounds under the present invention. The present invention is, however, not limited thereto. The phenol compounds may be used alone or in combination.

[Formulas 3]

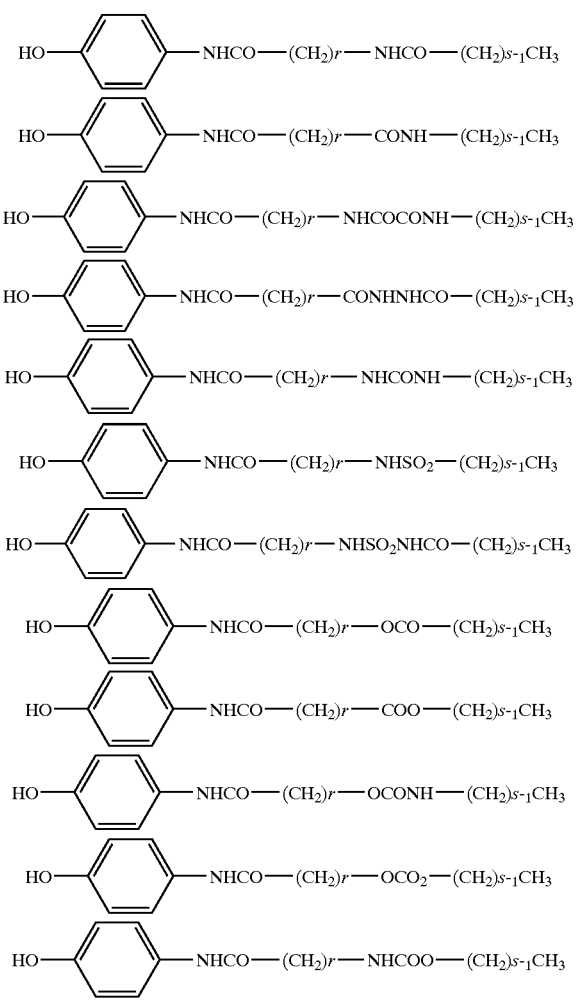

Examples of the developing agent of organic phosphoric acid include the following compounds. Dodecyl phosphonic acid, tetradecyl phosphonic acid, hexadecyl phosphonic acid, octadecyl phosphonic acid, eicosyl phosphonic acid, docosyl phosphonic acid, tetracosyl phosphonic acid, ditetradecyl ester phosphate, dihexadecyl ester phosphate, dioctadecyl ester phosphate, dieicosyl ester phosphate, and dibehenyl ester (Behenyl) phosphate, and the like.

Examples of the aliphatic carboxyl compounds include the following. 2-hydroxy tetradecanoic acid, 2-hydroxy hexadecanoic acid, 2-hydroxy octadecanoic acid, 2-hydroxy eicosane acid, 2-hydroxy docosane acid, 2-bromo hexadecanoic acid, 2-bromo octa decanoic acid, 2-bromo eicosane acid, 2-bromo docosane acid, 3-bromo docosane acid, 2,3-dibromo octadecanoic acid, 2-fluoro decanoic acid, 2-fluoro tetradecanoic acid, 2-fluoro hexadecanoic acid, 2-fluoro octa decanoic acid, 2-fluoro eicosane acid, 2-fluoro docosane acid, 2-iodohexa decanoic acid, 2-iodoocta decanoic acid, 3-iodohexa decanoic acid, 3-iodoocta decanoic acid, perfluoro octa decanoic acid, and the like.

Examples of aliphatic dicarboxylic acid compounds and tricarboxylic acid compounds are described below. 2-dodecyl oxysuccinic acid, 2-tetradecyl oxysuccinic acid, 2-hexadecyl oxysuccinic acid, 2-octadecyl oxysuccinic acid, 2-eicosyl oxysuccinic acid, 2-dodecyl oxysuccinic acid, 2-dodecyl thio succinic acid, 2-tetradecyl thio succinic acid, 2-hexadecyl thio succinic acid, 2-octadecyl thio succinic acid, 2-eicosyl thio succinic acid, 2-docosyl thio succinic acid, 2-tetracosyl thio succinic acid, 2-hexadecyl dithio succinic acid, 2-octadecyl dithio succinic acid, 2-eicosyl dithio succinic acid, dodecyl succinic acid, tetradecyl succinic acid, pentadecyl succinic acid, hexadecyl succinic acid, octadecyl succinic acid, eicosyl succinic acid, docosyl succinic acid, 2,3-dihexadecyl succinic acid, 2,3-dioctadecyl succinic acid, 2-methyl-3-hexadecyl succinic acid, 2-methyl-3-octadecyl succinic acid, 2-octadecyl-3-hexadecyl succinic acid, hexadecyl malonic acid, octadecyl malonic acid, eicosyl malonic acid, docosyl malonic acid, dihexadecyl malonic acid, dioctadecyl malonic acid, didocosyl malonic acid, methyl octadecyl malonic acid, 2-hexadecyl glutaric acid, 2-octadecyl glutaric acid, 2-eicosyl glutaric acid, docosyl glutaric acid, 2-pentadecyl adipic acid, 2-octadecyl adipic acid, 2-eicosyl adipic acid, 2-docosyl adipic acid, 2-hexa decanoyl oxypropane-1,2,3-tricarboxylic acid, 2-octa decanoyl oxypropane-1,2,3-tricarboxylic acid, and the like.

A proper ratio of the coloring coupler relative to the developing agent may vary with the combination of the compounds to be used, in general, mole ratio is 1 coloring coupler relative to 0.1 to 20 developing agent, preferably 0.2 to 10 developing agent. The developing agent out of the above range (more than or less than) may decrease density of the coloring state, which is problematical. Ratio of a decolorizing promoter is preferably 0.1 weight % to 300 weight % relative to the developing agent, more preferably 3 weight % to 100 weight %. The coloring coupler and the developing agent may be used encapsulated in a microcapsule. In the recording layer, ratio of the coloring component relative to the resin is 1 (coloring component) to 0.1 (resin) to 10 (resin). This ratio less than the above may shorten the heat strength of the recording layer, while the ratio more than the above may decrease the coloring density occasionally, which are problematical.

The reversible thermosensitive recording layer constituting the reversible thermosensitive recording material under the present invention may ordinarily contain the resin.

Specific examples of the resins contained in the reversible thermosensitive recording layer include i) resins having a group reactive with crosslinking agent such as acrylic polyol resin, polyester polyol resin, polyurethane polyol resin, phenoxy resin, polyvinyl butyral resin, cellulose acetate propionate, cellulose acetate butyrate and the like, ii) a resin which is a copolymerization of a first monomer (having a group reactive with crosslinking agent) and a second monomer other than the first monomer. The present invention is, however, not limited to the above compounds.

Moreover, the above resins may be subjected to a block copolymerization or a graft copolymerization with a benzotriazol ultraviolet absorbent bone or a cyclohexane bonding bone.

The reversible thermosensitive recording material which is the over sheet under the present invention, when necessary, may use an additive for improving and controlling coating property, coloring property, and decolorizing property of the thermosensitive recording layer. Examples of the above additive include surfactant, conductive agent, filler, oxidation inhibitor, light stabilizer, coloring stabilizer, decolorizing promoter, and the like. Preferable examples of the decolorizing promoter include i) a compound having a bivalent group (containing hetero atom) and an alkyl chain (having 8 or more carbon atoms), ii) a compound having N,N'-2 substitutional group, iii) and the like. The present invention is, however, not limited to the above compounds.

Under the present invention, the reversible thermosensitive recording layer may contain a curing agent.

Examples of the curing agent used herein include modified bodies known in the art such as urethane modified body of isocyanate monomer, allophanate modified body, isocyanurate modified body, bullet modified body, carbodiimide modified body, block doisocyanate, and the like. Examples of the isocyanate monomer forming the modified body include tolylenediisocyanate (TDI), 4,4'-diphenyl methane isocyanate (MDI), xylene diisocyanate (XDI), naphthalene diisocyanate (NDI), paraphenylene diisocyanate (PPDI), tetramethyl xylene diisocyanate (TMXDI), hexamethylene diisocyanate (HDI), dicyclo hexyl methane diisocyanate (HMDI), isophorone diisocyanate (IPDI), lysine diisocyanate (LDI), isopropylidene bis(4-cyclohexyl isocyanate) (IPC), cyclohexyl diisocyanate (CHDI), tolidine diisocyanate (TODI), and the like. The present invention is, however, not limited to the above compounds.

Moreover, the reversible thermosensitive recording layer may contain a curing agent of crosslinking promoter.

Examples of the crosslinking promoter include tertiary amines such as 1,4-diaza-bicyclo [2, 2, 2] octane, metal compound such as organic tin compound, and the like. The curing agent added may cause crosslinking reaction entirely or not entirely. In other words, unreacted curing agent is allowed.

The crosslinking reaction of the above may proceed according to the time elapsed. The above unreacted curing agent, therefore, does not necessarily signify that the crosslinking reaction is not proceeding at all. Instead, sensing the unreacted curing agent suggests that a resin in the crosslinking state is present. For distinguishing whether the polymer under the present invention is in the crosslinking state or a non-crosslinking state, submerging the coat film in the highly-soluble solvent is proposed.

More specifically, a polymer in the non-crosslinking state may become an eluate in the solvent, and thereby does not remain in a solute. With this, analyzing the polymer structure of the solute is recommended for the above distinction. Failure in verifying the polymer structure in the solute may indicate that the polymer is in the non-crosslinking state, distinguishing from the polymer in the crosslinking state.

When other layer(s) is laminated, a layer structure and a film thickness thereof are to be verified by a cross sectional photograph taken by TEM (transmission electron microscope), SEM (scanning electron microscope) and the like. Then, an irrelevant layer(s) is to be removed at all, to thereby expose a target layer. Then, the thus exposed layer is to be taken (shaved), to be followed by the measurement according to the above method.

Formation of the recording layer may use a coating solution which is prepared by evenly mixing-dispersing a mixture made of the developing agent, the coloring coupler, the various additives, the curing agent, the resin in crosslinking state, and the coating solvent which are described above.

Specific examples of the solvent used for preparing the coating solution include water; alcohols such as methanol, ethanol, isopropanol, n-butanol, methyl isocarbinol; ketones such as acetone, 2-butanone, ethyl amyl ketone, diacetone alcohol, isophorone, cyclohexanone, and the like; amides such as N,N-dimethyl formamide, N,N-dimethyl acetamide, and the like; ethers such as diethyl ether, isopropyl ether, tetrahydrofuran, 1,4-dioxane, 3,4-dihydro-2H-pyran, and the like; glycol ethers such as 2-methoxy ethanol, 2-ethoxy ethanol, 2-butoxy ethanol, ethylene glycol dimethyl ether, and the like; glycol ether acetates such as 2-methoxy ethyl acetate, 2-ethoxy ethyl acetate, 2-butoxy ethyl acetate, and the like; esters such as methyl acetate, ethyl acetate, isobutyl acetate, amyl acetate, ethyl lactate, ethylene carbonate, and the like; aromatic hydrocarbons such as benzene, toluene, xylene, and the like; aliphatic hydrocarbons such as hexane, heptane, iso-octane, cyclohexane, and the like; halogenated hydrocarbons such as methylene chloride, 1,2-dichloro ethane, dichloro propane, chloro benzene, and the like; sulfoxides such as dimethyl sulfoxide, and the like; pyrrolidone such as N-octyl-2-pyrrolidone; and the like.

Preparing the coating solution can be carried out by using known coating solution-dispersing unit such as paint shaker, ball mill, attritor, three-roll mill, sand mill, dynomill, colloid mill and the like. Dispersing each material in the solvent by using the above coating solution-dispersing unit is allowed, or dispersing each material alone in the solvent and mixing is also allowed. Moreover, heating-dissolving, followed by a rapid quenching or an annealing (slow cooling), and followed by depositing is allowed.

The coating method for forming the recording layer is not specifically limited, examples thereof including those known in the art such as blade coating, wire bar coating, spray coating, air knife coating, bead coating, curtain coating, gravure coating, kiss coating, reverse roll coating, dip coating, die coating, and the like.

After coating-drying of the recording layer, a curing treatment of the recording layer is to be carried out, when necessary. In this case, carrying out a heat treatment using a high temperature vessel and the like at a relatively high temperature for a short time is allowed, or carrying out the heat treatment at a relatively low temperature for a long time is also allowed. Specifically, the crosslinking reaction has the following preferable conditions in view of reactivity: 30° C. to 130° C. for 1 minutes to 150 hours, more preferably 40° C. to 100° C. for 2 minutes to 120 hours. Since productivity is esteemed in manufacturing, spending time until the crosslinking is sufficiently completed is of difficulty. The crosslinking step is, therefore, allowed to be provided apart from the drying step. The crosslinking step is preferred to have conditions of 40° C. to 100° C. for 2 minutes to 120 hours for heating.

Described next is the protective layer which can be arbitrarily provided on the reversible thermosensitive recording layer, for ordinarily preventing sticking and for improving durability.

The protective layer preferably has a thickness in a range from 0.1 $\mu$m to 20 $\mu$m, more preferably 0.3 $\mu$m to 10 $\mu$m.

The protective layer may contain an inorganic ultraviolet absorbent or an organic ultraviolet absorbent, for the purpose of preventing the texture fog (or background fog), content thereof being in a range from 0.5 weight parts to 50 weight parts relative to 100 weight parts of a binder.

Known methods and the like used for the above recording layer can be used for the protective layer, such as the solvent of the coating solution, the dispersing unit of the coating solution, the binder, the coating method, the drying-curing method, and the like.

Examples of the organic ultraviolet absorbents include:
i) benzo triazole ultraviolet absorbents such as 2-(2'-hydroxy-5'-methyl phenyl) benzo triazole, 2-(2'-hydroxy-5'-t-butyl phenyl) benzo triazole, 2-(2'-hydroxy-5'-t-butyl phenyl) benzo triazole, 2-(2'-hydroxy-3',5'-di-t-butyl phenyl) benzo triazole, 2-(2'-hydroxy-3'-t-butyl-5' octoxy phenyl) benzo triazole, 2-(2'-hydroxy-3',5'-di-t-butyl phenyl)-5-chloro benzo triazole, 2-(2'-hydroxy-3'-t-butyl-5'-methyl phenyl)-5-chloro benzo triazole, 2-(2'-hydroxy-5'-ethoxy phenyl) benzo triazole, and the like;
ii) benzo phenon ultraviolet absorbents such as 2,4-dihydroxy benzo phenon, 2-hydroxy-4-methoxy benzo phenon, 2-hydroxy-4-n-octoxy benzo phenon, 2-hydroxy-4-dodecyl oxy benzo phenon, 2,2'-dihydroxy-4-methoxy benzo phenon, 2,2'-dihydroxy-4,4'-dimethoxy benzo phenon, 2,2',4,4'-tetrahydroxy benzo phenon, 2-hydroxy-4-methoxy-2'-carboxy benzo phenon, 2-hydroxy-4-oxybenzil benzo phenon, 2-hydroxy-4-chloro benzo phenon, 2-hydroxy-4-methoxy benzo phenon-5-sulfonic acid, 2-hydroxy-4-methoxy benzo phenon-5-sodium sulfonate, 2,2'-dihydorxy-4,4'-dimethoxy benzo phenon-sodium sulfonate, and the like;
iii) salicylic acid ester ultraviolet absorbents such as phenyl salicylate, p-octyl phenyl salicylate, p-t-butyl phenyl salicylate, carboxy phenyl salicylate, methyl phenyl salicylate, dodecyl phenyl salicylate, 2-ethyl hexyl phenyl salicylate, homomenthyl phenyl salicylate, and the like;
iv) cyano acrylate ultraviolet absorbents such as 2-ethyl hexyl-2-cyano-3,3' diphenyl acrylate, ethyl-2-cyano-3,3'-diphenyl acrylate, and the like;
v) p-amino benzoic acid absorbents such as p-amino benzoic acid, p-amino glyceryl benzoate, p-dimethyl amino amyl benzoate, p-dihydroxy propyl ethyl benzoate, and the like;
vi) cinnamic acid ultraviolet absorbents such as p-methoxy cinnamic acid-2-ethyl hexyl, p-methoxy cinnamic acid-2-ethoxy ethyl, and the like;
4-t-butyl-4-methoxy-dibenzoyl methane;
urocanic acid;
urocanic acid ethyl; and the like.

Examples of the inorganic ultraviolet absorbents include zinc sulphide, titanium oxide, cerium oxide, tin oxide, molybdenum oxide, zinc oxide, barium oxide, silica, alumina, antimony oxide, magnesium oxide, zirconium oxide, barium oxide, calcium oxide, strontium oxide, silicone nitride, aluminum nitride, boron nitride, barium nitride, and the like.

For preventing sticking or improving durability of the protective layer, other fillers free from the ultraviolet absorbing property or the ultraviolet shutting property may be added to the protective layer, the fillers being divided into an inorganic filler and an organic filler.

Examples of the inorganic fillers include calcium carbonate, magnesium carbonate, silicic anhydride, hydrated silica, hydrated aluminum silicate, hydrated calcium silicate, alumina, iron oxide, calcium oxide, magnesium oxide, chromium oxide, manganese oxide, silica, talc, mica, and the like.

Examples of the organic fillers include silicone resin; cellulose resin; epoxy resin; nylon resin; phenol resin; polyurethane resin; urea resin; melamine resin; polyester resin; polycarbonate resin; styrene resins such as styrene, polystyrene, polystyrene- isoprene, styrene vinyl benzene, and the like; acrylic resins such as acrylic vinylidene chloride, acrylic urethane, acrylic ethylene, and the like; polyethylene resin; formaldehyde resins such as benzoguanamine formaldehyde, melamine formaldehyde, and the like; polymethyl methacrylate resin; vinyl chloride resin; and the like. Under the present invention, the fillers may be used alone or in combination of two or more. In the case of the plurality of the fillers, the combination of the inorganic filler and the organic filler is not specifically limited. Configuration thereof may include sphere, grain, plate, needle, and the like. Content of the filler in the protective layer is 5 volume % to 50 volume %.

For preventing fusion to the thermal head, the protective layer may be added by a lubricant, specific examples thereof including synthetic waxes such as ester wax, paraffin wax, polyethylene wax, and the like; plant wax such as cured castor oil and the like; animal wax such as beef tallow cured oil and the like; higher alcohols such as stearyl alcohol, behenyl alcohol, and the like; higher fatty acids such as margaric acid, lauric acid, myristic acid, palmitic acid, stearic acid, behenic acid; higher fatty acid esters such as sorbitan fatty acid ester; amides such as stearamide, oleamide, amide laurate, ethylene bis stearamide, methylene bis stearamide, methylol stearamide, and the like; and the like. Content of the lubricant in the protective layer is 0.1 volume % to 95 volume %, more preferably 1 volume % to 75 volume %.

The reversible thermosensitive recording material used as the over sheet under the present invention may be provided with an intermediate layer between the recording layer and the protective layer, for the purpose of i) improving adhesion between the recording layer and the protective layer, ii) preventing the recording layer from causing degeneration attributable to application of the protective layer, iii) preventing the additive in the protective layer from moving to the recording layer, and iv) preventing the additive in the recording layer from moving to the protective layer.

Preferably, the intermediate layer has a thickness in a range from 0.1 $\mu$m to 20 $\mu$m, more preferably 0.3 $\mu$m to 10 $\mu$m. Known methods and the like used for the above recording layer can be used for the intermediate layer, such as the solvent, the dispersing unit of the coating solution, the binder, the coating method, the drying-curing method, and the like.

The intermediate layer may contain an inorganic ultraviolet absorbent or an organic ultraviolet absorbent (which are used for the above protective layer), for the purpose of preventing the texture fog (or background fog), content thereof being in a range from 0.5 weight parts to 50 weight parts relative to 100 weight parts of the binder.

Moreover, the reversible thermosensitive recording material for the information recording-displaying card under the present invention may allow the reversible thermosensitive recording layer to contain a photothermal transducer substance; or may be provided, adjacent to the recording layer, with a layer containing the photothermal transducer substance (referred to as photothermal transducer layer).

Making the above structure containing the photothermal transducer substance can carry out the recording (coloring and decolorizing) even when a low-output semiconductor laser and the like are used.

Of the above two methods using the photothermal transducer substance, providing the photothermal transducer layer adjacent to the reversible thermosensitive recording layer is more preferable in view of cost (i.e., photothermal transducer substance is costly) and less influence on the material constituting the recording layer.

Moreover, under the present invention, an ultraviolet absorbent layer having a visible-light transparency can be provided so as to protect the layer containing the photothermal transducer substance.

Examples of the photothermal transducer substance include an infrared absorbent pigment, carbon black and the like, which have an absorption peak in the vicinity of oscillating wavelength of a semiconductor laser beam to be used.

In general, the semiconductor laser to be used has wavelength range from 100 nm to 1000 nm, more preferably 700 nm to 900 nm, and the infrared absorbent pigment preferably has the peak absorption wavelength in the above range. Examples of the above pigment include cyanine pigment, polymethine pigment, anthraquinone pigment, and the like. Of the above pigments, the phthalocyanine pigment and the naphthal cyanine pigment are preferable.

The phthalocyanine pigment and the naphthal cyanine pigment have a structure having resistance to deterioration such as decomposition and the like caused by heat or ultraviolet ray, thus increasing the number of rewritings.

In view of chemical stability such as weatherability and heat resistance and the like, the reversible thermosensitive recording material under the present invention is especially preferred to be formed with various metals and various complexes.

Adding a singlet oxygen quencher is allowed for improving chemical stability.

In general, the reversible thermosensitive recording material which is the over sheet under the present invention is produced by sequentially forming, on the support, the recording layer and other necessary layers. The present invention is, however, not limited to the above, and other production method as described below is allowed.

For example, the reversible thermosensitive recording material having sequentially the reversible thermosensitive recording layer and the protective layer on the support can be produced in the following steps: i) preparing a protective layer face to be disposed on the uppermost layer and a peelable base sheet having high peelability, ii) applying a coating solution on the peelable base sheet to thereby form the protective layer at first, iii) then, forming the thermosensitive recording layer on the protective layer by a coating method, iv) then, adhering the support film to the thermosensitive recording layer, and v) finally, peeling the peelable base sheet.

The reversible thermosensitive recording material which is the over sheet under the present invention may be partly or entirely provided with a coloring layer which has an arbitrary picture pattern made by printing methods such as an offset print, a gravure print, and the like; by printers such as an inkjet printer, a heat transfer printer, a sublimation printer, and the like; and the like. Moreover, an upper portion of the coloring layer may be partly or entirely provided with an OP (over print) varnish layer having, as main component thereof, a setting resin.

Figure 3:
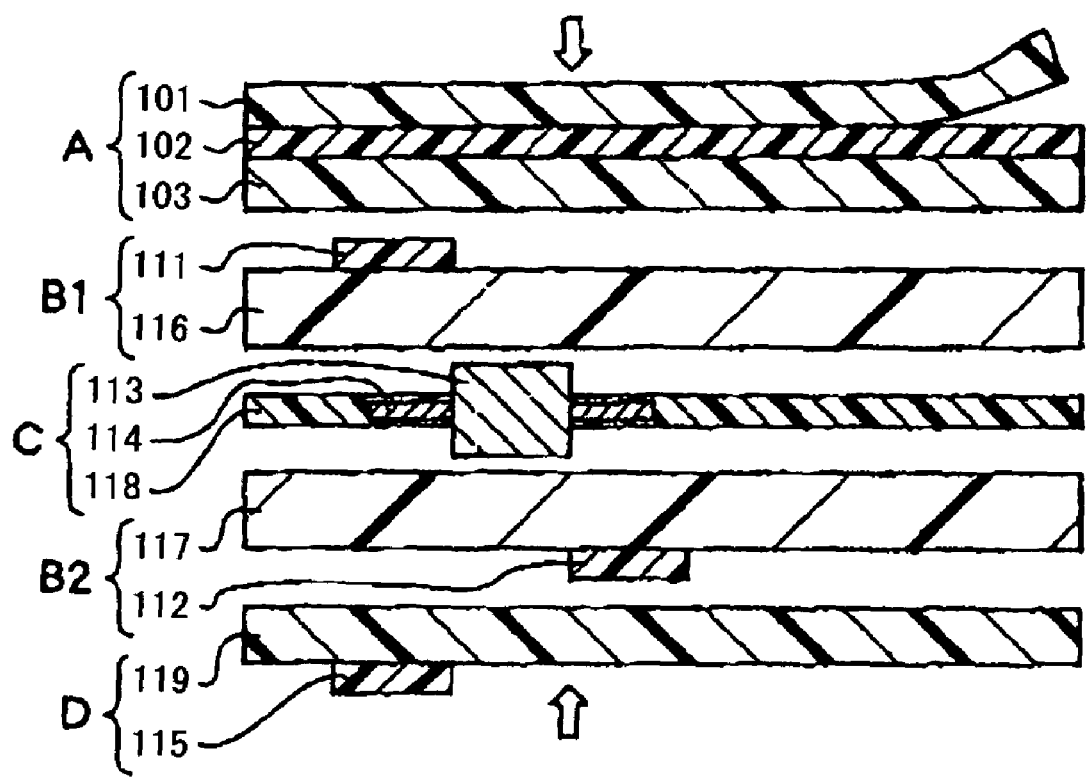
FIG. 3 is a cross sectional view of a state before the heating-pressing, so as to exemplify a method of manufacturing an IC card which is an example of an information recording-displaying card under the present invention.
Figure 4:
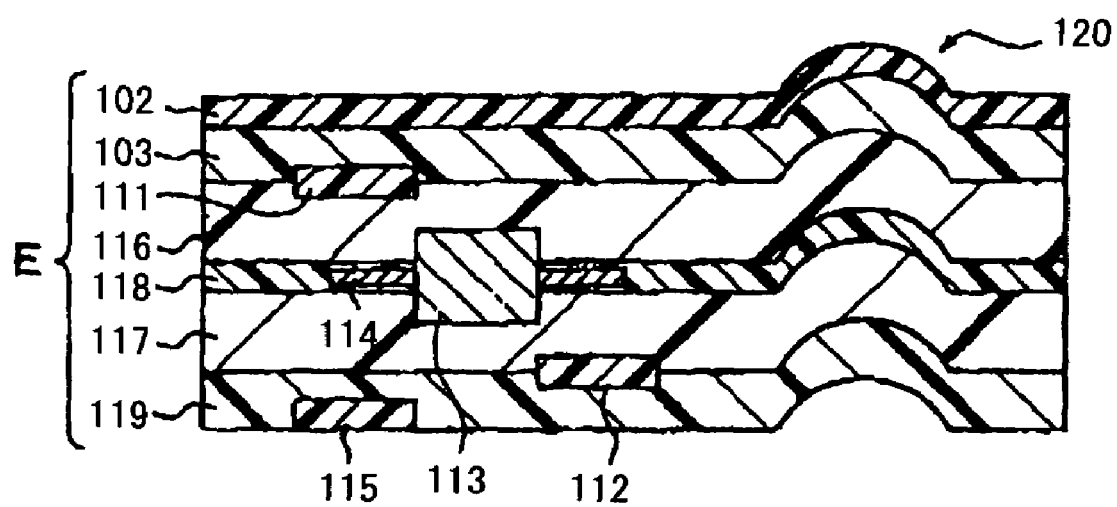
FIG. 4 is a cross sectional view of a state of the IC card in FIG. 3, after the heating-pressing and a subsequent embossing.

FIG. 3 and FIG. 4 show an example of the information recording-displaying card under the present invention, specifically, a method of making an IC card having a print layer.

FIG. 3 is a cross sectional view of a layer structure before the pressing for forming the IC card. The IC card in FIG. 3 has the following structure: An inlet sheet C is interposed between a first core sheet portion B1 and a second core sheet portion B2. Outside the first core sheet portion B1, there is provided an over sheet A which is so overlapped with the first core sheet portion B1 that an over sheet support 103 contacts the first core sheet portion B1. Outside the second core sheet portion B2 on the opposite side, an outer layer sheet portion D is overlapped. Heating-pressing the over sheet A and the outer layer sheet portion D from respective outsides thereof by means of a heating-pressing machine can form a layer body for the IC card. Hereinabove, the inlet sheet C has a sheet 118 which is provided with a non-contact IC chip 113 having an antenna coil 114. The outer layer sheet portion D includes an outer layer sheet 119 having a magnetic stripe layer 115 which has been temporality transferred in advance. The first core sheet portion B1 includes a print layer 111 on the over sheet As side of a white core sheet 116, while the second core sheet portion B2 includes a print layer 112 on the outer layer sheet portion D's side of a white core sheet 117.

Then, removing a peelable base material 101 and subsequently cutting, with a punch blade, the layer structure into a card can form the IC card. In the above method of removing the peelable base material 101 in the final step allows the peelable base material 101 to function as a protective film of the reversible thermosensitive recording layer 102. With this, the IC card in its manufacturing step can be free from i) scratches and ii) smear of heat press mirror plate which smear may be caused by bleed and the like from the reversible thermosensitive recording layer 102.

The method in FIG. 3 of removing the peelable material 101 after the heating-pressing can be replaced with the following method. Removing in advance the peelable base material 101 from the over sheet A, overlapping the over sheet A with the first core sheet portion B1, carrying out the heating-pressing as described above, and thereby forming the IC card. The over sheet having the thus obtained structure can be treated like a thick over sheet which is used generally, thereby a production line for the general card can be used. Moreover, an over sheet whose peelable base material is removed and which is rolled can be used.

Under the embodiment, the pressing condition is preferred to have a pressing temperature in a range from 100° C. to 150° C., a pressing pressure in a range from 10 kgf/cm$^2$ to 50 kgf/cm$^2$, and a pressing time in a range from 5 minutes to 60 minutes.

The IC card formed by the heating-pressing as is seen in FIG. 3, after being formed into the card, can be embossed (character) by means of an embosser. FIG. 4 shows the IC card having an emboss 120.

As the sheet material for a sheet provided with the non-contact IC chip equipped with the antenna coil, i) those substantially like the material for the above core sheet and the above outer layer sheet, ii) an engineering plastic, iii) and the like can be used. Especially preferable are the materials excellent in heat resistance. The antenna coil may be formed by carrying out printing of the above sheet or an etching of the above sheet. The IC card in FIG. 3 uses a sheet which is provided with the non-contact chip and the like equipped with the antenna coil. The present invention is, however, not limited thereto. An IC chip wired with an antenna coil is usable.

Information of the magnetic tape, the IC chip and the like which are installed on the IC card under the present invention can be read or written by the known conventional method (contact or non-contact), namely, reading stored information or writing new information is accomplished.

The image processing method under the present invention may be added by any other step(s), as long as at least one of the displaying and erasing of the image is carried out by heating the surface of the image displaying section of the information recording-displaying card under the present invention.

For forming a coloring image on the reversible thermosensitive recording material which is the over sheet under the present invention, the over sheet is to be heated to a coloring temperature or over followed by a rapid quenching.

Specifically, heating with the thermal head or the laser beam for a short time may locally heat the recording layer, thus causing an immediate heat diffusion, leading to a rapid quenching. With this, a coloring state can be fixed.

On the other hand, decolorizing may be carried out by: i) heating for relatively a long time by means of a proper heat source followed by cooling, or ii) temporarily heating at a temperature slightly lower than the coloring temperature. Heating for a long time may increase temperature of an extensive area of the recording medium, thus delaying the subsequent cooling. In this step, therefore, the decolorizing may be caused. In this heating method, a heat roller, a heat stamp, a hot air, a ceramic heater and the like may be used, otherwise, a thermal head may be used for a long time heating. For heating the recording layer to the decolorizing temperature range, decreasing an applied energy to slightly lower than a recording energy is preferred. In the above decreasing of the applied energy, a voltage applied to the thermal head or a pulse width to the thermal head is to be adjusted.

Using the above method, the thermal head alone can carry out the recording-erasing, thereby enabling so-called an over writing that includes erasing of the image and displaying of a new image. Examples of the recording unit include, other than an ordinary printer, a heat transfer printer, a sublimation printer, and the like. Erasing can be carried out by heating to the decolorizing temperature range by means of a heat roller, a heat stamp, and the like.

The image processor under the present invention is not specifically limited, as long as at least one of the following is provided: i) an image displaying unit for displaying the image to the information recording-displaying card under the present invention, ii) an image erasing unit for erasing the image, and iii) an image displaying-erasing unit for displaying and erasing the image.

Examples of the image displaying unit include a thermal head, a laser system, and the like; while examples of the image erasing unit include a thermal head, a ceramic heater, a heat roller, a heat stamp, a hot air machine, and the like.

EXAMPLE

The information recording-displaying card under the present invention is to be described more in detail hereinafter based on examples. The information recording-displaying card under the present invention is, however, not limited to descriptions in the examples.

Example 1

<<Form Barrier Layer>>

A support sheet (branded as DIAFIX PG-CHI made by Mitsubishi Plastics, Inc.) made of an amorphous aromatic polyester resin and having thickness of 100 μm was prepared.

Then, a barrier layer was formed in the following steps: i) preparing a drawing PET film (branded as DIAFOIL K233E made by Mitsubishi Polyester film Japan) having thickness of 4.5 μm, ii) coating one face of the drawing PET film with a two-solution adhesive solution (namely, containing a urethane resin and an isocyanate crosslinking agent), iii) drying, iv) forming an adhesive layer having thickness of 1 μm, v) overlapping the drawing PET film (thickness of 4.5 μm) on the sheet made of the amorphous aromatic polyester resin, to be followed by dry laminating, vi) aging the thus obtained sheet for 24 hours at an atmospheric temperature of 40° C., and vii) forming the barrier layer on the support.

<<Form Reversible Recording Layer>>

The following dispersing solution was prepared for forming the reversible thermosensitive recording layer. The dispersing solution as a coating solution was applied on the barrier layer (the drawing PET film) with a wire bar, then was dried at 80° C. for 5 minutes. Then, curing was carried out at 60° C. for 24 hours, to thereby form the reversible thermosensitive recording layer having film thickness of about 10 μm.

(Dispersing Solution for Reversible Thermosensitive Recording Layer)

1) Developing agent having the following structural formula 4 parts

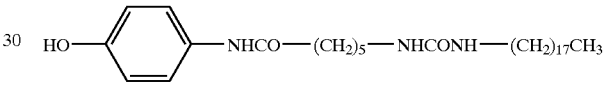

2) Dialkyl carbamide (branded as Hakreen SB made by Nihon Kasei CO., LTD.)
   1 part
3) Acrylic polyol 50% solution 9 parts
   (branded as LR503 made by Mitsubishi Rayon Co., Ltd.)
4) Methyl ethyl ketone 70 parts The above compositions were pulverized and dispersed by means of a ball mill into particles having an average particle diameter of about 1 μm.

5) 2-anilino-3-methyl-6-dibutyl amino fluoran 1 part
6) Isocyanate (branded as CORONATE HL made by NIPPON POLYURETHANE INDUSTRY CO., LTD.) 2 parts The above compositions were put into a dispersing solution in which developing agent is pulverized and dispersed, followed by a sufficient stirring, to thereby prepare a recording layer coating solution.

Then, the following coating solution for forming the protective layer was prepared. The coating solution was applied on the thus formed reversible thermosensitive recording layer, forming thickness of 2 μm. Then, an ultraviolet ray (conditions: 120 W/cm×10 m/min) was irradiated for setting. Then, aging was carried out at 60° C. for 16 hours, to thereby form the protective layer.

With the above steps, an over sheet was thus prepared having sequential layers of the support, the barrier layer, the reversible thermosensitive recording layer, and the protective layer.

(Coating Solution for Forming Protective Layer)
1) Urethane acrylate ultraviolet setting resin 15 parts
   (branded as C7-157 made by Dainippon Ink and Chemicals Incorporated)
2) Filler (branded as P527 made by MIZUSAWA INDUSTRIAL CHEMICALS, LTD.) 5 parts 3) Ethyl acetate 85 parts The above compositions were sufficiently dissolved-stirred, to thereby prepare the coating solution for forming the protective layer.

As the reversible recording property in the prescription structure, the erasable limit temperature is 170° C.

Example 2

In the preparation of the over sheet, the example 1 was likewise carried out, except that the barrier layer was changed as follows:

A sheet made of an amorphous aromatic polyester resin (branded as DIAFIX PG-CHI made by Mitsubishi Plastics, Inc.) having thickness of 100 μm was prepared. Barrier layer: a drawing PET film (branded as DIAFOIL K230E made by Mitsubishi Polyester film Japan) having thickness of 6 μm was used for a dry laminating on the above amorphous aromatic polyester resin sheet.

Example 3

In the preparation of the over sheet, the example 1 was likewise carried out, except that the barrier layer was changed as follows:

A sheet made of an amorphous aromatic polyester resin (branded as DIAFIX PG-CHI made by Mitsubishi Plastics, Inc.) having thickness of 100 μm was prepared. Barrier layer: a drawing PET film (branded as DIAFOIL KC230-8E made by Mitsubishi Polyester film Japan) having thickness of 8 μm was used for a dry laminating on the above amorphous aromatic polyester resin sheet.

Example 4

For preparing the over sheet, an amorphous aromatic polyester resin sheet (branded as DIAFIX PG-CHI made by Mitsubishi Plastics, Inc.) having thickness of 100 μm was prepared. On a surface of the thus prepared amorphous aromatic polyester resin sheet, the following coating solution for the barrier layer was applied by means of a bar coater.

Then, the example 1 was likewise carried out, except that an ultraviolet (160 W/cm×10 m/min) was irradiated for setting and that the barrier layer had thickness of 2 μm.

(Coating Solution for Barrier Layer)
Ultraviolet ray setting resin:
  5-function acrylate monomer 50 weight parts
    (branded as KAYARAD D-310 made by NIPPON KAYAKU CO., LTD.)
Photo polymerization starting agent:
    (branded as IRGACURE 184 made by Chiba Speciality Chemicals) 3 weight parts
Coating solvent: 2-propanol 50 weight parts

Example 5

As a peelable base material, a polyethylene terephthalate film (thickness of 38 μm) was prepared which had been coated in advance with a silicone resin on its surface.

To the above silicone-coated surface, an epoxy acrylate ultraviolet ray setting resin was applied, followed by irradiating of 160 W/cm of the ultraviolet ray at 10 m/minute for setting, to thereby form a protective layer having thickness of 5 μm.

Then, the dispersing solution for the reversible thermosensitive recording layer which solution was used in the example 1 was applied to a surface of the protective layer (namely, a layered body of peelable base material and protective layer), then drying at 80° C. for 5 minutes, and then aging at 60° C. for 24 hours, to thereby form a reversible thermosensitive recording layer having thickness of 10 μm after the drying.

To an amorphous aromatic polyester resin sheet (branded as DIAFIX PG-CHI made by Mitsubishi Plastics, Inc.) having thickness of 100 μm, the recording layer's side of a layered body (constituted of the peelable base material, the protective layer, the reversible thermosensitive recording layer which are thus obtained) was bonded (dry laminating), by using 2-solution adhesive (namely, urethane resin and isocyanate crosslinking agent).

After forming the layer structure of the peelable base material, the protective layer, the reversible thermosensitive recording layer, and the support, the peelable base material was peeled, to thereby obtain the over sheet.

Example 6

For preparing the over sheet, a support sheet (prototype PETG/PC (9/1) made by Mitsubishi Plastics, Inc.) having thickness of 100 μm was prepared which sheet contained a polymer alloy resin made of an amorphous aromatic polyester resin and a polycarbonate resin. Except for the above preparation (change), the example 1 was likewise carried out, to thereby prepare the over sheet.

Example 7

For preparing the over sheet, a support sheet (prototype PETG/PC (7/3) made by Mitsubishi Plastics, Inc.) having thickness of 100 μm was prepared which sheet contained a polymer alloy resin made of an amorphous aromatic polyester resin and a polycarbonate resin. Except for the above preparation (change), the example 1 was likewise carried out, to thereby prepare the over sheet.

Example 8

The example 1 was likewise carried out, except that the developing agent of the dispersing solution for the reversible thermosensitive recording layer was changed to following compound, to thereby prepare an information recording-displaying card.

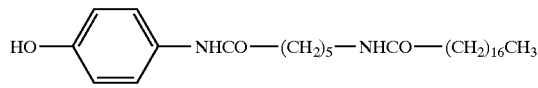

Comparative Example 1

The example 1 was likewise carried out, except that the barrier layer was changed as follows in the preparation of the over sheet, to thereby prepare the over sheet:

An amorphous aromatic polyester resin sheet (branded as DIAFIX PG-CHI made by Mitsubishi Plastics, Inc.) having thickness of 100 μm was prepared. Barrier layer: a drawing PET film (branded as DIAFOIL H100 made by Mitsubishi Polyester film Japan) having thickness of 12 μm was used for a dry laminating on the above amorphous aromatic polyester resin sheet.

Comparative Example 2

The example 1 was likewise carried out, except that the barrier layer was changed as follows in the preparation of the over sheet, to thereby prepare the over sheet:

An amorphous aromatic polyester resin sheet (branded as DIAFIX PG-CHI made by Mitsubishi Plastics, Inc.) having thickness of 100 μm was prepared. Barrier layer: a drawing PET film (branded as DIAFOIL T100E made by Mitsubishi Polyester film Japan) having thickness of 38 μm was used for a dry laminating on the above amorphous aromatic polyester resin sheet.

Comparative Example 3

The example 5 was likewise carried out, except for the following change, to thereby prepare the over sheet:
the amorphous aromatic polyester resin sheet having thickness of 100 μm was changed to:
a drawing PET having thickness of 125 μm.

Comparative Example 4

The example 5 was likewise carried out, except for the following change, to thereby prepare the over sheet:
the amorphous aromatic polyester resin sheet having thickness of 100 μm was changed to:
a vinyl chloride resin sheet having thickness of 100 μm.

Comparative Example 5

The example 1 was likewise carried out, except for the following change, to thereby prepare the over sheet:
the amorphous aromatic polyester resin sheet (branded as DIAFIX PG-CHI made by Mitsubishi Plastics, Inc.) having thickness of 100 μm was changed to:
a direct layering of the reversible recording layer on the amorphous aromatic polyester resin sheet, without any intervention by a film or a barrier layer. In the applying of the reversible recording layer, the amorphous aromatic polyester resin sheet was eroded and then dried. Soon after the drying, the over sheet was deformed, causing a rough surface thereof.

<<Prepare Information Recording-Displaying Card>>

As an outer layer sheet, an amorphous aromatic polyester resin sheet (branded as DIAFIX PG-CHI made by Mitsubishi Plastics, Inc.) having thickness of 100 μm was prepared. As a core sheet, an amorphous polyester sheet (branded as DIAFIX PG-WHI made by Mitsubishi Plastics, Inc.) having thickness of 280 μm was prepared.

The above outer layer sheet, the above core sheets and the over sheets obtained in the examples, the comparative example 1, the comparative example 2, the comparative example 3 and the comparative example 5 were cut into a size of 300 mm×300 mm.

As is seen in FIG. 1A and FIG. 1B, two of the core sheets were overlapped on one outer layer sheet. Moreover, the over sheets prepared in the examples, the comparative example 1, the comparative example 2, the comparative example 3 and the comparative example 5 were disposed such that the support of the over sheet was overlapped on the two sheets. Then, the thus formed layers were interposed between chromium plating plates not to cause drift (or displacement, shear, the like), followed by heating-pressing, to thereby unite the layers by fusion.

The heating temperature was 120° C., and the pressing pressure was 15 kg/cm² (sheet face pressure), and the pressing time was 10 minutes. The thus united sheet by fusion was cooled, taken out, subjected to a punching into a card configuration, to thereby prepare the information recording-displaying card.

Over sheet prepared in the example 4:
Like the above, the over sheet prepared in the example 4 was used for preparing the information recording-displaying card, except that the core sheet was a vinyl chloride sheet having thickness of 280 μm.

Evaluations of the over sheets and the information recording-displaying cards thus prepared were carried out, the results thereof being shown in the following Table 1.

Evaluation Method:
(1) Surface Waviness
The surface wavinesses (5.0 mm of length) of the over sheets prepared in the examples and the comparative examples were measured using a surface roughness-configuration measuring apparatus (made by TOKYO SEIMITSU).

(2) Storage Elasticity E'
The over sheets prepared in the examples and the comparative examples were measured using "Viscosity-Elasticity Spectrometer" made by Iwamoto Seisakusho by carrying out a tensile test (temperature distribution of dynamic viscosity) at a frequency of 1 Hz. An actual number was used for calculating the storage elasticity E'.

(3) Measure erasing temperature of over sheet
A heat slope tester HG-100 (made by TOYO SEIKI KOGYO CO., LTD.) was used. Conditions: 5° C. stepwise temperatures under a pressure of 1 Kgf/cm for 1 second. A printing image reaching a saturated density was erased. Herein, a temperature of a coloring density of "less than or equal to texture density+0.02" was defined as an erasing temperature.

(4) Measure Rewriteability
A card printer R28000 (made by Kyushu Matsushita) was used. Printing conditions: 0.75 mJ. Heater bar temperature: 140° C. A thermal head was used for printing of the information recording-displaying card thus prepared. Then, the thus printed section was heated by means of a heater bar for erasing the print section. A print erasing section was visually checked based on the following criteria:
Criterion 1: No visible erasing remnant checked is defined as "good."
Criterion 2: Visible erasing remnant checked is defined as "fair."
Criterion 3: Obvious erasing remnant checked is defined as "not acceptable."

(5) Measure Embossability
The thus formed card was embossed by using a HAND EMBOSSER JIKEN NE-1000 (made by NIHON JIKEN). The thus embossed card was checked for warp.
Criterion: Warp more than 2.5 mm was defined as "not acceptable."
The embossing was carried out in a method specified in JIS X6301 and JIS 6302.
The card's warp was measured in a method specified in JIS X6301 and JIS 6305. The external view of the emboss was evaluated by visually checking for a crack of the over sheet or a peeling of the over sheet.
Criterion 1: Over sheet having no crack or peeling is defined as "acceptable."
Criterion 2: Over sheet having crack or peeling defined as "not acceptable."

(6) Environmental Property
The thus prepared information recording-displaying card was subjected to a burning, so as to check for dioxin.
Criterion 1: No dioxin is caused is defined as "acceptable."
Criterion 2: Dioxin is caused is defined as "not acceptable."

TABLE 1

| | Base material for over sheet | | Base material for core sheet | | Type of barrier layer | Storage elasticity E' at 180° C. | Temp. of storage elasticity E' (1.0 E + 08) | Waviness (WcM) μm | Erasing upper limit temp. | Eraseability | Embossability Card's warp (mm) | Embossability External view, crack, peeling | Environmental property | Total evaluation |
|---|---|---|---|---|---|---|---|---|---|---|---|---|---|---|
| | Type | Thickness (μm) | Type | Thickness (μm) | | | | | | | | | | |
| Example 1 | PG-CHI | 100 | PG-WHI | 280 | 4.5 μm PET | 2.5 × 10⁷ | 110 | 6.84 | 170 | Acceptable | 2.2 | Acceptable | Acceptable | Acceptable |
| Example 2 | PG-CHI | 100 | PG-WHI | 280 | 6 μm PET | 4.0 × 10⁷ | 125 | 6.84 | 170 | Acceptable | 2.0 | Acceptable | Acceptable | Acceptable |
| Example 3 | PG-CHI | 100 | PG-WHI | 280 | 8 μm PET | 5.0 × 10⁷ | 134 | 6.84 | 170 | Acceptable | 2.0 | Acceptable | Acceptable | Acceptable |
| Example 4 | PG-CHI | 100 | PG-WHI | 280 | 3 μm UV layer | 4.5 × 10⁷ | 98 | 8.58 | 170 | Acceptable | 2.4 | Acceptable | Acceptable | Acceptable |
| Example 5 | PG-CHI | 100 | PG-WHI | 280 | — | 1.0 × 10⁶ | 81 | 6.84 | 170 | Acceptable | 1.9 | Acceptable | Acceptable | Acceptable |
| Example 6 | PETG/PC (9/1) | 100 | PG-WHI | 280 | 4.5 μm PET | 2.6 × 10⁷ | 119 | 6.84 | 170 | Acceptable | 2.1 | Acceptable | Acceptable | Acceptable |
| Example 7 | PETG/PC (7/3) | 100 | PG-WHI | 280 | 4.5 μm PET | 3.0 × 10⁷ | 136 | 6.84 | 170 | Acceptable | 2.0 | Acceptable | Acceptable | Acceptable |
| Example 8 | PG-CHI | 100 | PG-WHI | 280 | 4.5 μm PET | 2.5 × 10⁷ | 110 | 6.84 | 150 | Acceptable | 2.2 | Acceptable | Acceptable | Acceptable |
| Comparative example 1 | PG-CHI | 100 | PG-WHI | 280 | 12 μm PET | 6.0 × 10⁷ | 142 | 6.84 | 170 | Not acceptable | 2.8 (Not acceptable) | Acceptable | Acceptable | Not acceptable |
| Comparative example 2 | PG-CHI | 100 | PG-WHI | 280 | 38 μm PET | 8.5 × 10⁷ | 170 | 6.84 | 170 | Not acceptable | 3.9 (Not acceptable) | Not acceptable | Acceptable | Not acceptable |
| Comparative example 3 | T100E | 125 | PG-WHI | 280 | — | 4.0 × 10⁸ | >200 | 6.84 | 170 | Not acceptable | 3.7 (Not acceptable) | Not acceptable | Acceptable | Not acceptable |
| Comparative example 4 | C-8195 | 100 | C-4636 | 280 | — | 1.0 × 10⁶ | 80 | 6.84 | 170 | Acceptable | 2.1 | Acceptable | Not acceptable | Not acceptable |
| Comparative example 5 | PG-CHI | 100 | PG-WHI | 280 | — | 1.0 × 10⁶ | 81 | 13.6 | 170 | — | — | — | Acceptable | Not acceptable |

As evident from the detailed and specific description above, the information recording-displaying card and the over sheet under the present invention can be easily embossed, and are excellent in card's machinability (by bonding to a thick base material of a reversible thermosensitive recording medium) and in eraseability. In addition, the information recording-displaying card and the over sheet under the present invention are easy to scrap and dispose, causing no environmental pollution. Moreover, the method of forming the information recording-displaying card can form the image recording-displaying card under the present invention imparting thereto good quality.

Moreover, the present invention can provide an image processing method and an image processor which are proper for manufacturing the image recording-displaying card under the present invention.

What is claimed is:

1. An information recording-displaying card, comprising:
    a core sheet; and
    an over sheet bonded to the core sheet,
        wherein the over sheet comprises:
        a support which comprises an amorphous polyester resin, and
        a reversible thermosensitive recording layer disposed on the support,
            wherein the reversible thermosensitive recording layer comprises:
            an electron-donating coloring compound, and
            an electron-accepting compound,
        wherein the reversible thermosensitive recording layer is capable of forming a coloring state and a decolorizing state, with a difference in at least one of the following:
        a heating temperature, and
        a cooling rate after a heating, and
    wherein the over sheet is embossable in an upper portion thereof, functions as an image displaying section, and meets the following condition (A), condition (B) and condition (C):
    condition (A) (the over sheet's upper limit temperature for erasing−30° C.)>(the over sheet's temperature of a storage elasticity E' (1.0 E+08) Pa),
    condition (B) 10 μm or less of a surface waviness, and
    condition (C) 1.0 E+02 Pa≦(the storage elasticity E' of the reversible thermosensitive over sheet at 180° C.)≦5.0 E+07 Pa.

2. The information recording-displaying card according to claim 1, wherein the temperature of the storage elasticity E' (1.0 E+08) Pa of the over sheet is less than 140° C.

3. The information recording-displaying card according to claim 1, wherein the over sheet is bonded to substantially an entire face of the core sheet.

4. The information recording-displaying card according to claim 1, wherein the support is one of the following:
    an amorphous polyester resin, and
    a polymer alloy which comprises an amorphous polyester resin and a polycarbonate resin.

5. The information recording-displaying card according to claim 1, wherein a barrier layer is interposed between the support and the reversible thermosensitive recording layer.

6. The information recording-displaying card according to claim 5, wherein the barrier layer comprises, as a main component thereof, a resin which is capable of at least one of the following:
    being soluble in at least one of an alcohol solvent and water, and
    being dispersed in at least one of the alcohol solvent and the water.

7. The information recording-displaying card according to claim 5, wherein the barrier layer is formed by bonding a resin film.

8. The information recording-displaying card according to claim 7, wherein the resin film of the barrier layer has a thickness of 8 μm or less.

9. The information recording-displaying card according to claim 7, wherein the resin film of the barrier layer is a polyester film subjected to a crystallizing treatment.

10. The information recording-displaying card according to claim 1, wherein the electron-donating coloring compound is a leuco dye.

11. The information recording-displaying card according to claim 1, wherein the electron-accepting compound is a phenol containing a straight chain hydrocarbon.

12. The information recording-displaying card according to claim 1, wherein the core sheet comprises at least a thermoplastic resin sheet having a thickness in a range from 0.05 mm to 5.00 mm.

13. The information recording-displaying card according to claim 12, wherein the core sheet is made of a materiel which is substantially common to a material for the support constituting the over sheet.

14. The information recording-displaying card according to claim 1, wherein the information recording-displaying card comprises an information storing section.

15. The information recording-displaying card according to claim 14, wherein the information storing section is one of the following:
    a section which comprises a magnetic material as a main material, and
    an IC chip.

16. The information recording-displaying card according to claim 14, wherein the core sheet comprises a plurality of thermoplastic resin sheets between which an IC chip is embedded, to thereby form the information storing section.

17. The information recording-displaying card according to claim 14, wherein the over sheet has the information storing section which comprises, as a main material therefor, a magnetic material.

18. The information recording-displaying card according to claim 1, wherein the information recording-displaying card has a mark formed through an embossing.

19. The information recording-displaying card according to claim 18, wherein the mark formed through the embossing is disposed on the over sheet.

20. A method of manufacturing an information recording-displaying card, comprising:
    heating-pressing a core sheet and an over sheet at a melting temperature or less of an electron-accepting compound, to thereby bond the over sheet with the core sheet,
        wherein the over sheet comprises:
        a support which comprises an amorphous polyester resin, and
        a reversible thermosensitive recording layer disposed on the support,
            wherein the reversible thermosensitive recording layer comprises:
            an electron-donating coloring compound, and
            the electron-accepting compound,
        wherein the reversible thermosensitive recording layer is capable of forming a coloring state and a decolorizing state, with a difference in at least one of the following:
        a heating temperature, and
        a cooling rate after a heating, and wherein the over sheet is embossable in an upper portion thereof, functions as an image displaying section, and meets the following condition (A), condition (B) and condition (C):

condition (A) (the over sheet's upper limit temperature for erasing−30° C.)>(the over sheet's temperature of a storage elasticity E' (1.0 E+08) Pa), condition (B) 10 μm or less of a surface waviness, and condition (C) 1.0 E+02 Pa≦(the storage elasticity E' of the reversible thermosensitive over sheet at 180° C.)≦5.0 E+07 Pa.

21. The method of manufacturing the information recording-displaying card according to claim 20, wherein the heating-pressing is carried out at 150° C. or less, for bonding the over sheet with the core sheet.

22. An over sheet, comprising:
a support which comprises an amorphous polyester resin; and
a reversible thermosensitive recording layer disposed on the support,
wherein the reversible thermosensitive recording layer comprises:
an electron-donating coloring compound, and
an electron-accepting compound,
wherein the reversible thermosensitive recording layer is capable of forming a coloring state and a decolorizing state, with a difference in at least one of the following:
a heating temperature, and
a cooling rate after a heating, and
wherein the over sheet is embossable in an upper portion thereof, functions as an image displaying section, and meets the following condition (A), condition (B) and condition (C):
condition (A) (the over sheet's upper limit temperature for erasing−30° C.)>(the over sheet's temperature of a storage elasticity E' (1.0 E+08) Pa),
condition (B) 10 μm or less of a surface waviness, and
condition (C) 1.0 E+02 Pa≦(the storage elasticity E' of the reversible thermosensitive over sheet at 180° C.)≦5.0 E+07 Pa.

23. An image processing method, comprising:
heating a surface of an image displaying section of an information recording-displaying card; and
carrying out thereby at least one of the following:
displaying an image, and
erasing the image,
wherein the information recording-displaying card, comprises:
a core sheet;
an over sheet bonded to the core sheet,
wherein the over sheet comprises:
a support which comprises an amorphous polyester resin, and
a reversible thermosensitive recording layer disposed on the support,
wherein the reversible thermosensitive recording layer comprises:
an electron-donating coloring compound, and
an electron-accepting compound,
wherein the reversible thermosensitive recording layer is capable of forming a coloring state and a decolorizing state, with a difference in at least one of the following:
a heating temperature, and
a cooling rate after a heating, and
wherein the over sheet is embossable in an upper portion thereof, functions as an image displaying section, and meets the following condition (A), condition (B) and condition (C):
condition (A) (the over sheet's upper limit temperature for erasing−30° C.)>(the over sheet's temperature of a storage elasticity E' (1.0 E+08) Pa),
condition (B) 10 μm or less of a surface waviness, and
condition (C) 1.0 E+02 Pa≦(the storage elasticity E' of the reversible thermosensitive over sheet at 180° C.)≦5.0 E+07 Pa.

24. The image processing method according to claim 23, wherein a thermal head is used for the displaying of the image.

25. The image processing method according to claim 23, wherein one of a thermal head and a ceramic heater is used for the erasing of the image.

26. The image processing method according to claim 23, wherein
the thermal head is used for the displaying and the erasing of the image, and
an over writing is carried out by the erasing of the image and a displaying of a new image.

27. An image processor, comprising:
at least one of the following:
an image displaying unit for displaying an image to an information recording-displaying card;
an image erasing unit for erasing the image; and
an image displaying-erasing unit for displaying and erasing the image,
wherein the information recording-displaying card comprises:
a core sheet;
an over sheet bonded to the core sheet,
wherein the over sheet comprises:
a support which comprises an amorphous polyester resin, and
a reversible thermosensitive recording layer disposed on the support,
wherein the reversible thermosensitive recording layer comprises:
an electron-donating coloring compound, and
an electron-accepting compound,
wherein the reversible thermosensitive recording layer is capable of forming a coloring state and a decolorizing state, with a difference in at least one of the following:
a heating temperature, and
a cooling rate after a heating, and
wherein the over sheet is embossable in an upper portion thereof, functions as an image displaying section, and meets the following condition (A), condition (B) and condition (C):
condition (A) (the over sheet's upper limit temperature for erasing−30° C.)>(the over sheet's temperature of a storage elasticity E' (1.0 E+08) Pa),
condition (B) 10 μm or less of a surface waviness, and
condition (C) 1.0 E+02 Pa≦(the storage elasticity E' of the reversible thermosensitive over sheet at 180° C.)≦5.0 E+07 Pa.

28. The image processor according to claim 27, wherein
the image processor comprises at least the image displaying unit, and
the image displaying unit is a thermal head.

29. The image processor according to claim 27, wherein
the image processor comprises at least the image erasing unit, and
the image erasing unit is one of a thermal head and a ceramic heater.

* * * * *